(12) United States Patent
Kubota

(10) Patent No.: US 6,597,525 B2
(45) Date of Patent: Jul. 22, 2003

(54) OPTICAL FILTER AND IMAGE DISPLAY

(75) Inventor: Tadahiko Kubota, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 4 days.

(21) Appl. No.: 09/963,653

(22) Filed: Sep. 27, 2001

(65) Prior Publication Data

US 2002/0075580 A1 Jun. 20, 2002

(30) Foreign Application Priority Data

Sep. 29, 2000 (JP) ........................................ 2000-298669
Sep. 29, 2000 (JP) ........................................ 2000-298813
Apr. 27, 2001 (JP) ........................................ 2001-132652

(51) Int. Cl.$^7$ ................................................ G02B 5/22
(52) U.S. Cl. .................... 359/885; 359/359; 313/582; 313/586; 313/587; 349/106
(58) Field of Search .................. 359/885, 359; 313/582, 586, 587, 479, 112; 349/106

(56) References Cited

U.S. PATENT DOCUMENTS

| | | | | |
|---|---|---|---|---|
| 5,024,923 A | * | 6/1991 | Suzuki | 430/372 |
| 5,811,923 A | * | 9/1998 | Zieba | 313/479 |
| 5,945,209 A | * | 8/1999 | Okazaki | 428/304.4 |
| 6,469,440 B1 | * | 10/2002 | Saito | 313/582 |
| 2002/0005509 A1 | * | 1/2002 | Teng | 252/582 |

* cited by examiner

Primary Examiner—John Juba, Jr.
Assistant Examiner—Leo Boutsikaris
(74) Attorney, Agent, or Firm—Burns, Doane, Swecker & Mathis, LLP

(57) ABSTRACT

An optical filter comprising: a laminate (A) comprising: a first transparent support; and at least one of an antireflection layer, an antiglare layer, a soil-resistant layer, a hard coat layer and an antistatic layer; a transparent support (B); and at least one of a visible light absorption layer and an infrared shield layer, the infrared shield layer absorbing near infrared rays having a wavelength of 750 nm to 1200 nm, wherein the at least one of a visible light absorption layer and an infrared shield layer is provided on the first transparent support at the opposite side to that the at least one of an antireflection layer, an antiglare layer, a soil-resistant layer, a hard coat layer and an antistatic layer are provided, or on the transparent support (B).

14 Claims, No Drawings

OPTICAL FILTER AND IMAGE DISPLAY

FIELD OF THE INVENTION

The present invention relates to an optical filter fitted to an image display such as a plasma display panel (PDP), a liquid crystal display (LCD), an electroluminescence display (ELD), a cathode ray tube display (CRT), a fluorescent display tube or a field emission type display for preventing a reflection of external light, and an image display on a surface of which the optical filter is affixed.

BACKGROUND OF THE INVENTION

An image display such as a plasma display panel (PDP), a liquid crystal display (LCD), an electroluminescence display (ELD), a cathode ray tube display (CRT), a fluorescent display tube or a field emission type display has originally a flat screen, or progresses in flat panel formation. Although the distortion at screen edges is decreased by flat panel formation, the reflection of external light on a surface of the screen still presents a problem. The enlargement of the screen further magnifies the problem.

Further, these displays indicate color images by light combinations of three primary colors of red, blue and green. However, it is very difficult, substantially impossible to use ideal three primary colors as light for indication. For example, in the plasma display panel (PDP), it is known that light emitted from a three primary color luminescent material contains excess light (having a wavelength ranging from 500 nm to 620 nm).

Then, for correcting the color balance of display colors, it is proposed that color correction is carried out by using a filter absorbing light having a specific wavelength. The color correction using the filters are described in JP-A-58-153904 (the term "JP-A" as used herein means an "unexamined published Japanese patent application"), JP-A-61-188501, JP-A-3-231988, JP-A-5-205643, JP-A-9-145918, JP-A-9-306366 and JP-A-10-26704.

Further, electromagnetic waves are emitted from display faces of electronic displays such as a PDP, an LCD, an ELD and a CRT, so that it is necessary to shield them. As a method therefor, a method of affixing metal meshes to front plates of CRTs is known to provide high electromagnetic shielding properties, and proposed in JP-A-62-150282, JP-A-4-48507, JP-A-10-75087, JP-A-11-119669 and JP-A-11-204046.

However, this method has the effect of preventing electromagnetic waves, but has the problem that geometric patterns formed by pixels of the displays interferes with geometric patterns formed by the meshes to cause a moire phenomenon.

Still further, the problem is reported that infrared rays (mainly having a wavelength of 750 nm to 1100 nm) emitted from displays causes the faulty operation of remote controllers. For solving this problem, infrared absorption filters are used. Dyes used in the infrared absorption filters are described in U.S. Pat. No. 5,945,209. However, they are not sufficient.

In addition, in PDPs, the glass thickness of display faces of main bodies is only about 3 mm, so that tempered glass plates called "front glass plates" are attached, apart from the main bodies, for preventing damage (JP-A-8-55581). This poses the problems of increasing the total weight and raising the cost.

SUMMARY OF THE INVENTION

It is therefore an object of the invention to provide an optical filter preventing a reflection of external light, reducing the intensity of infrared rays emitted from an image display, being able to improve the color purity, and causing no moiré phenomenon, when it is applied to the image display.

Another object of the invention is to provide an optical filter making a front glass plate removable while maintaining the damage prevention of a screen of an image display and safety in damage, and being able to realize a decrease in weight of a main body of the image display and cost reduction.

A still another object of the invention is to provide an image display which is provided with the optical filter excellent in the above-mentioned characteristics, and from which a front glass plate is removed while maintaining the damage prevention of a screen of an image display and safety in damage.

As a result of intensive investigation by the present inventors, the objects of the invention have been attained by an optical filter and an image display having the following constitution:

1. An optical filter comprising: a laminate (A) comprising: a first transparent support; and at least one of an antireflection layer, an antiglare layer, a soil-resistant layer, a hard coat layer and an antistatic layer; a transparent support (B); and at least one of a visible light absorption layer and an infrared shield layer, the infrared shield layer absorbing near infrared rays having a wavelength of 750 nm to 1200 nm, wherein the at least one of a visible light absorption layer and an infrared shield layer is provided on the first transparent support at the opposite side to that the at least one of an antireflection layer, an antiglare layer, a soil-resistant layer, a hard coat layer and an antistatic layer are provided, or on the transparent support (B).

2. The optical filter described in 1 above, wherein the laminate (A) is disposed on a viewer side and the transparent support (B) is disposed on a front side of an image display, and the laminate (A) comprises the antireflection layer as an outermost layer.

3. The optical filter described in 2 above, which comprises: (a) at least one transparent support other than the transparent support (B) between the laminate (A) and a front face of the image display, wherein one transparent selected from the group consisting of the first transparent support, the transparent support (B), and the at least one transparent support other than the transparent support (B) has a thickness of 225 $\mu$m or more, and the total thickness of the first transparent support, the transparent support (B), and the at least one transparent support other than the transparent support (B) is within the range of 300 $\mu$m to 1000 $\mu$m, and (b) at least one adhesive layer, wherein the total thickness of the at least one adhesive layer is within the range of 30 $\mu$m to 150 $\mu$m.

4. The optical filter described in 1 above, which has an elastic modulus of 3.5 GPa or less.

5. The optical filter described in 1 above, wherein a conductive layer having a surface resistivity of 500 $\Omega$/square or less is provided on a transparent support other than the first transparent support.

6. The optical filter described in 5 above, wherein the conductive layer comprises one of a metal film and a laminate of a metal film and a metal oxide film.

7. The optical filter described in 1 above, wherein the infrared shield layer comprises a dye having an absorption in the infrared region.
8. The optical filter described in 1 above, wherein the infrared shield layer comprises a dye having a transmittance of 20% or less in each of the ranges of 750 nm to 850 nm, 851 nm to 950 nm and 951 nm to 1100 nm.
9. The optical filter described in 1 above, wherein the visible light absorption layer comprises a dye.
10. The optical filter described in 9 above, wherein the dye is a cyanine dye.
11. The optical filter described in 1 above, wherein the visible light absorption layer has an absorption maximum in the wavelength region of 560 nm to 620 nm.
12. The optical filter described in 1 above, wherein the half-value width of a light absorption band of the visible light absorption layer is 50 nm or less.
13. An image display in which the optical filter described in 1 above is affixed to a front face of the image display.
14. The image display described in 13 above, wherein the image display is a plasma display panel.

DETAILED DESCRIPTION OF THE INVENTION

The invention will be further illustrated in greater detail with reference to the following embodiments, which are, however, not to be construed, of course, as limiting the invention.

The optical filter of the invention is a laminate comprising at least a laminate (A) in which at least one of an antireflection layer, an antiglare layer, a soil-resistant layer, a hard coat layer and an antistatic layer is provided on one face of a transparent support, and a transparent support (B).

Either or both of a visible light absorption layer and an infrared shield layer absorbing near infrared rays having a wavelength of 750 nm to 1200 nm are provided on a face opposite to that of the transparent support on which the layers constituting the above-mentioned laminate (A) are provided, or on the transparent support (B), and an electromagnetic shielding layer is provided as needed.

As described above, for preventing glass damage and an injury by glass in damage caused by the removal of a front glass plate, the transparent support has a laminate structure in which two or more layers are laminated.

It is preferred that the above-mentioned laminate has an elastic modulus of 3.5 GPa or less.

A preferred mode of the optical filter of the invention is an optical filter composed of a laminate having the above-mentioned layer structure, in which three transparent supports are laminated, one of these three transparent supports has a thickness of 225 μm or more, the total thickness of the three supports is from 450 μm to 1000 μm, one or more adhesive layers are contained for adhering the transparent supports, the total thickness of the adhesive layers is 30 μm to 150 μm, and the laminate has an elastic modulus of 3.5 GPa or less.

Specific examples of the laminate structures of the optical filters of the invention will be described below:

(1) Low reflection layer/hard coat layer/antistatic layer/transparent support/visible light absorption layer—cum-infrared shield layer/adhesive layer/transparent support/adhesive layer;

(2) Low reflection layer/hard coat layer/antistatic layer/transparent support/visible light absorption layer—cum-infrared shield layer/adhesive layer/transparent support/adhesive layer/transparent support/adhesive layer;

(3) Low reflection layer/hard coat layer/antistatic layer/transparent support/visible light absorption layer/infrared shield layer/adhesive layer/transparent support/adhesive layer/transparent support/adhesive layer;

(4) Low reflection layer/hard coat layer/antistatic layer/transparent support/visible light absorption layer/infrared shield layer/adhesive layer/electromagnetic shielding layer/transparent support/adhesive layer/transparent support/adhesive layer;

(5) Low reflection layer/hard coat layer/antistatic layer/transparent support/visible light absorption layer/infrared shield layer/adhesive layer/transparent support/adhesive layer/electromagnetic shielding layer/transparent support/adhesive layer; and (6) Low reflection layer/hard coat layer/antistatic layer/transparent support/adhesive layer/transparent support/visible light absorption layer/near infrared screening layer/adhesive layer/transparent support/adhesive layer.

In the present invention, these layers may be formed as layers each having either a single function or two or more functions together.

The transparent supports, the respective layers and components of the layers, which constitute the optical filters of the invention, will be described below.

[Transparent Supports]

In the optical filter of the invention, two or more transparent supports, preferably 3 to 5 transparent supports, are used. The use of the plurality of transparent supports improves the impact resistance of a surface of a display.

Preferred examples of materials of the transparent supports used in the invention include cellulose esters (e.g., cellulose diacetate, cellulose triacetate, cellulose propionate, cellulose butyrate, cellulose acetate propionate, cellulose nitrate), polyamides, polycarbonates, polyesters (e.g., polyethylene terephthalate, polyethylene naphthalate, polybutylene terephthalate, poly-1,4-cyclohexanedimethylene terephthalate, polyethylene-1,2-diphenoxyethane 4,4'-dicarboxylate), polystyrenes (e.g., syndiotactic polystyrene), polyolefins (e.g., polyethylene, polypropylene, polymethylpentene), poly(meth)acrylates (e.g., polymethyl methacrylate), polysulfones, polyether sulfones, polyether ketones, polyether imides and polyoxyethylene. Preferred are cellulose triacetate, polycarbonates, polymethylmethacrylate, polyethylene terephthalate and polyethylene naphthalate.

The transmittance of the transparent supports is preferably 80% or more, and more preferably 86% or more. The haze thereof is preferably 2% or less, and more preferably 1% or less. The refractive index thereof is preferably from 1.45 to 1.70.

Further, for improving the stability of dyes contained in the visible light absorption layers described later, infrared absorbers or ultraviolet absorbers may be added to the transparent supports, as long as the transparency of the transparent supports is not impaired. The amount of the infrared absorber added is preferably from 0.01% to 20% by weight, and more preferably from 0.05% to 10% by weight, based on the transparent support.

Particles of inactive inorganic compounds maybe further added as lubricants to the transparent supports. Examples of the inorganic compounds include $SiO_2$, $TiO_2$, $BaSO_4$, $CaCO_3$, talc and kaolin.

The transparent supports are preferably surface treated for making stronger the adhesion thereof to layers provided thereon (for example, undercoat layers). Examples of the surface treatments include a chemical treatment, a mechanical treatment, a corona discharge treatment, a flame treatment, an ultraviolet irradiation treatment, a high-frequency treatment, a glow discharge treatment, an active plasma treatment, a laser treatment, a mixed acid treatment and an ozone oxidation treatment. Preferred are the glow discharge treatment, the ultraviolet irradiation treatment, the corona discharge treatment and the flame treatment, and more preferred is the corona discharge treatment.

[Adhesive Layers]

When the supports are laminated with each other, adhesives are used. The adhesives as used herein are adhesive materials, and have rubbery viscosity. Preferred examples of the adhesives include natural rubber adhesives, SBR adhesives, butyl rubber adhesives, acrylic adhesives, polyisobutylene adhesives, silicone rubber adhesives and polyvinyl butyl ether. Of these, the acrylic adhesives are preferred.

As the adhesives, there can be used ones described in "High-Functional Binders Adhesives" edited by Kobunshi Gakkai.

The adhesive layers are obtained by directly applying coating solutions in which these adhesives are dissolved or dispersed in water or solvents, and drying them. However, the adhesive layers can also be provided by laminating supports having good release properties such as PET supports, which are previously provided with the adhesive layers.

The optical filter has one or more adhesive layers. It is preferred from the viewpoint of improved impact resistance that the total thickness of the adhesive layers is within the range of 0 $\mu$m to 1000 $\mu$m. It is more preferably within the range of 20 $\mu$m to 500 $\mu$m, and particularly preferably within the range of 30 $\mu$m to 200 $\mu$m.

[Infrared Shield Layers]

The transparent supports are preferably provided with layers having the infrared screening effect (infrared shield layers).

It is preferred that the infrared shield layers have the screening effect to near infrared rays having a wavelength of 800 nm to 1200 nm. The infrared shield layers can be formed by resin mixtures. Infrared screening components which can be used in the resin mixtures include copper (described in JP-A-6-118228), copper compounds or phosphorus compounds (described in JP-A-62-5190), copper compounds or thiourea compounds (described in JP-A-6-73197), and tungsten compounds (described in U.S. Pat. No. 3,647,772). Instead of providing the infrared shield layers, the resin mixtures may be added to the transparent supports.

The optical filter of the invention has a transmittance of 20% or less, more preferably 15% or less, and particularly preferably 10% or less, in the ranges of 750 nm to 850 nm, 851 nm to 950 nm and 951 nm to 1100 nm, more preferably 790 nm to 845 nm, 860 nm to 945 nm and 960 nm to 1050 nm, and most preferably 800 nm to 840 nm, 870 nm to 940 nm and 970 nm to 1030 nm. It is particularly preferred that the optical filter has a light absorption maximum in each wavelength region.

In the invention, for giving the above-mentioned absorption spectrum, the infrared shield layers are formed using coloring matter (dyes or pigments).

As to the absorption spectrum of the dye showing the absorption maximum in the above-mentioned wavelength region of 750 nm to 1100 nm, less sub-absorption in the visible region (400 nm to 700 nm) is better so as not to decrease the luminance of fluorescent substances. For obtaining a preferred waveform, the use of the dye in the associated state is particularly preferred.

The dye in the associated state forms a so-called J bond, so that it shows a sharp absorption spectrum peak. Details of the association of dyes and J bonds are described in literatures (for example, *Photographic Science and Engineering*, 18, 323–335 (1974)). The absorption maximum of the dye in the J associated state is shifted to the longer wavelength side than the absorption maximum of the dye in the solution state. It can be therefore easily judged by measuring the absorption maximum whether the dye contained in the filter layer is in the associated state or in the non-associated state.

In this specification, the state in which the absorption maximum is shifted 30 nm or more to the longer wavelength side than the absorption maximum of the dye in the solution state is called the associated state. For the dye in the associated state, the shift of the absorption maximum is preferably 30 nm or more, more preferably 40 nm or more and most preferably 45 nm or more.

In the dyes, some compounds form aggregates only by dissolving them in water. However, in general, aggregates are formed by adding gelatin or salts (for example, barium chloride, potassium chloride, sodium chloride and calcium chloride) to aqueous solutions of the dyes. A method of adding gelatin to aqueous solutions of the dyes is particularly preferred.

The aggregates of the dyes can also be formed as fine solid particle dispersions of the dyes. For obtaining the fine solid particle dispersions, known dispersing devices can be used. Examples of the dispersing devices include a ball mill, a vibration ball mill, a planetary ball mill, a sand mill, a colloid mill, a jet mill and a roller mill. The dispersing devices are described in JP-A-52-92716 and PCT International Publication No. WO88/074794. Vertical or horizontal medium dispersing devices are preferred.

The dispersing may be carried out in the presence of appropriate media (for example, water and alcohols). The use of surfactants for dispersing is preferred. As the surfactants for dispersing, there are preferably used anionic surfactants (described in JP-A-52-92716 and PCT International Publication No. WO88/074794). Anionic polymers, non-ionic surfactants or cationic surfactants may be used as needed.

After the dyes are dissolved in appropriate solvents, poor solvents for the dyes may be added to obtain fine particle powders. In this case, the above-mentioned surfactants for dispersing may also be used. The dyes may also be dissolved by pH adjustment, and then, changed in pH to precipitate fine crystals of the dyes. The fine crystals are also the aggregates of the dyes.

When the dyes in the associated state are fine particles (or fine crystals), the average particle size thereof is preferably from 0.01 $\mu$m to 10 $\mu$m.

The dyes used in the associated state are preferably methine dyes (e.g., cyanine, merocyanine, oxonol, styryl), and most preferred are cyanine dyes and oxonol dyes.

The cyanine dyes are defined by the following formula:

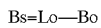

wherein Bs is a basic nucleus, Bo is an onium of a basic nucleus, and Lo is a methine chain consisting of an odd number of methine units.

Further, the cyanine dye represented by the following formula (1) can be preferably used, particularly in the associated state:

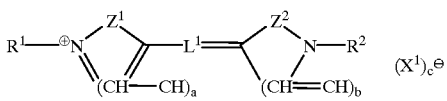

(1)

wherein $Z^1$ and $Z^2$ are each independently a nonmetallic atomic group forming a 5- or 6-membered nitrogen-containing heterocycle. Another heterocycle, aromatic ring or aliphatic ring maybe condensed with the nitrogen-containing heterocycle. Examples of the nitrogen-containing heterocycles and their condensed rings include an oxazole ring, an isoxazole ring, a benzoxazole ring, a naphthoxazole ring, an oxazolocarbazole ring, an oxazolobenzofuran ring, a thiazole ring, a benzothiazole ring, a naphthothiazole ring, an indolenine ring, a benzoindolenine ring, an imidazole ring, a benzimidazole ring, a naphthimidazole ring, a quinoline ring, a pyridine ring, a pyrrolopyridine ring, a furopyrrole ring, an indolizine ring, an imidazoquinoxaline ring and a quinoxaline ring. The 5-membered nitrogen-containing heterocycles are preferred to the 6-membered ones. The 5-membered nitrogen-containing heterocycles with which benzene rings or naphthalene rings are condensed are more preferred. Preferred is the benzothiazole ring, the naphthothiazole ring, the indolenine ring or the benzoindolenine ring.

The nitrogen-containing heterocycles and the rings condensed therewith may have substituent groups. Examples of the substituent groups include a halogen atom, a cyano group, a nitro group, an aliphatic group, an aromatic group, a heterocyclic group, $-OR^{10}$, $-COR^{11}$, $-COOR^{12}$, $-OCOR^{13}$, $-NR^{14}R^{15}$, $-NHCOR^{16}$, $-CONR^{17}R^{18}$, $NHCONR^{19}R^{20}$, $NHCOOR^{21}$, $-SR^{22}$, $-SO_2R^{23}$, $-SO_2OR^{24}$, $-NHSO_2R^{25}$ and $-SO_2NR^{26}R^{27}$. $R^{10}$ to $R^{27}$ are each independently a hydrogen atom, an aliphatic group, an aromatic group or a heterocyclic group. When $R^{12}$ of $-COOR^{12}$ is hydrogen, that is to say, when $-COOR^{12}$ is carboxyl, the hydrogen atom may be dissociated, or $-COOR^{12}$ may be in the salt state. When $R^{24}$ of $-SO_2OR^{24}$ is hydrogen, that is to say, when $-SO_2OR^{24}$ is sulfo, the hydrogen atom may be dissociated, or $-SO_2OR^{24}$ may be in the salt state.

In the invention, the aliphatic group indicates an alkyl group, an alkenyl group, an alkynyl group or an aralkyl group. These groups may have substituent groups.

The alkyl group may be cyclic or chain-like. The chain-like alkyl group may be branched. The alkyl group has preferably from 1 to 20 carbon atoms, more preferably from 1 to 12 carbon atoms, and most preferably from 1 to 8 carbon atoms. Examples of the alkyl groups include methyl, ethyl, propyl, isopropyl, butyl, t-butyl, cyclopropyl, cyclohexyl and 2-ethylhexyl.

Alkyl moieties of the substituted alkyl groups are the same as the above-mentioned alkyl groups. The substituent groups for the substituted alkyl groups are the same as the substituent groups for the nitrogen-containing heterocycles of $Z^1$ and $Z^2$ (with the proviso that a cyano group and a nitro group are excluded). Examples of the substituted alkyl groups include 2-hydroxyethyl, 2-carboxyethyl, 2-methoxyethyl, 2-diethylaminoethyl, 3'-sulfopropyl and 4-sulfobutyl.

The alkenyl group may be cyclic or chain-like. The chain-like alkenyl group may be branched. The alkenyl group has preferably from 2 to 20 carbon atoms, more preferably from 2 to 12 carbon atoms, and most preferably from 2 to 8 carbon atoms. Examples of the alkenyl groups include vinyl, allyl, 1-propenyl, 2-butenyl, 2-pentenyl and 2-hexenyl.

Alkenyl moieties of the substituted alkenyl groups are the same as the above-mentioned alkenyl groups. The substituent groups for the substituted alkenyl groups are the same as the substituent groups for the alkyl groups.

The alkynyl group may be cyclic or chain-like. The chain-like alkynyl group may be branched. The alkynyl group has preferably from 2 to 20 carbon atoms, more preferably from 2 to 12 carbon atoms, and most preferably from 2 to 8 carbon atoms. Examples of the alkynyl groups include ethynyl and 2-propynyl.

Alkynyl moieties of the substituted alkynyl groups are the same as the above-mentioned alkynyl groups. The substituent groups for the substituted alkynyl groups are the same as the substituent groups for the alkyl groups.

Alkyl moieties of the aralkyl groups are the same as the above-mentioned alkyl groups. Aryl moieties of the aralkyl groups are the same as aryl groups described later. Examples of the aralkyl groups include benzyl and phenetyl.

Aralkyl moieties of the substituted aralkyl groups are the same as the above-mentioned aralkyl groups. Aryl moieties of the substituted aralkyl groups are the same as aryl groups described later.

In the invention, the aromatic group means an aryl group or a substituted aryl group. The aryl group has preferably from 6 to 25 carbon atoms, more preferably from 6 to 15 carbon atoms, and most preferably from 6 to 10 carbon atoms. Examples of the aryl groups include phenyl and naphthyl.

Examples of the substituent groups for the substituted aryl groups are the same as the substituent groups for the nitrogen-containing heterocycles of $Z^1$ and $Z^2$. Examples of the substituted aryl groups include 4-carboxyphenyl, 4-acetamidophenyl, 3-methanesulfonamidophenyl, 4-methoxyphenyl, 3-carboxyphenyl, 3,5-dicarboxyphenyl, 4-methanesulfonamidophenyl and 4-butanesulfonamidophenyl.

In the invention, the heterocyclic groups may have substituent groups. Heterocycles of the heterocyclic groups are preferably 5- or 6-membered rings. aliphatic rings, aromatic rings or other heterocycles may be condensed with the heterocycles. Examples of the heterocycles (including condensed rings) include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring and a thiadiazole ring.

The substituent groups for the heterocycles are the same as the substituent groups for the nitrogen-containing heterocycles of $Z^1$ and $Z^2$.

The aliphatic group and the aromatic group represented by $Z^1$ and $Z^2$ of formula (1) are the same as described above.

$L^1$ is a methine chain consisting of an odd number of methine units, preferably 5 or 7 methine units.

The methine group may have a substituent group, preferably at the center (at the meso position). Examples of the substituent groups are the same as the substituent groups for the nitrogen-containing heterocycles of $Z^1$ and $Z^2$. Two substituent groups of the methine chain may combine with each other to form a 5- or 6-membered ring.

a, b and c are each independently 0 or 1. a and b are preferably 0. When the cyanine dye has an anionic substituent group such as sulfo or carboxyl to form an internal salt, c is 0.

$X^1$ is an anion. Examples of the anions include halide ions ($Cl^-$, $Br^-$ and $I^-$), a p-toluenesulfonic acid ion, an ethylsulfuric acid ion, $PF_6^-$, $BF_4^-$ and $ClO_4^-$.

It is preferred that the cyanine dye used contains a carboxyl group or a sulfo group. Specific examples of the cyanine dyes are shown below:

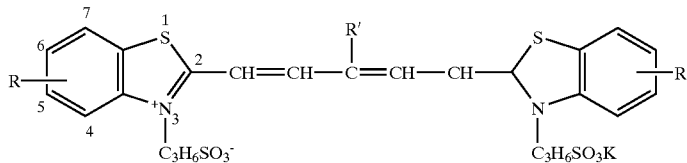

| Dye | R | R' |
|---|---|---|
| 1-1 | 6-Cl | CH₂Ph |
| 1-2 | " | 4-pyridylmethyl |
| 1-3 | 5-Cl | CH₃ |
| 1-4 | 5-Ph | " |
| 1-5 | " | CH₂Ph |
| 1-6 | 5-CH₃ | H |
| 1-7 | 5,6-di-CH₃ | H |

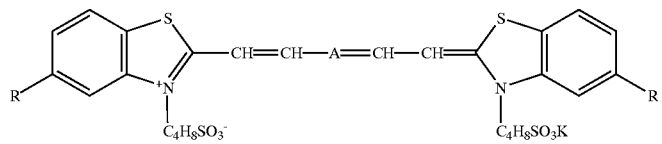

| Dye | R | A |
|---|---|---|
| 1-8 | Cl | 2-chloro-3-methylenecyclohex-1-enyl |
| 1-9 | F | 2-chloro-3-methylenecyclohex-1-enyl |
| 1-10 | Cl | 2-(N-methyl-N-phenylamino)-3-methylenecyclopent-1-enyl |
| 1-11 | Cl | 2-(4-ethoxycarbonylpiperazin-1-yl)-3-methylenecyclopent-1-enyl |

-continued

| Dye | A |
|---|---|
| 1-12 | —CH=CH—CH= |
| 1-13 | (3-chloro-2-methylcyclopent-2-enylidene)methyl group |
| 1-14 | (2-methyl-3-(4-ethoxycarbonylpiperazin-1-yl)cyclopent-2-enylidene)methyl group |
| 1-15 | —CH=C(4-pyridyl)—CH= |
| 1-16 | —CH=C(Ph)—CH= |

| Dye | A |
|---|---|
| 1-17 | —CH=CH—CH= |
| 1-18 | —CH=C(4-pyridyl)—CH= |
| 1-19 | (2-chloro-3-methylcyclohex-2-enylidene)methyl group |

-continued

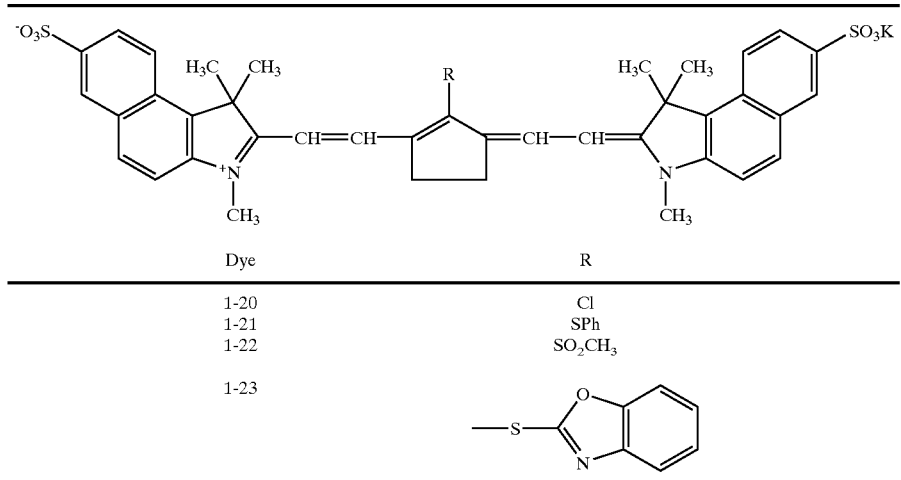

| Dye | R |
|---|---|
| 1-20 | Cl |
| 1-21 | SPh |
| 1-22 | SO$_2$CH$_3$ |
| 1-23 | 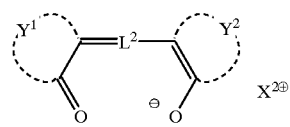 |

The oxonol dye is defined by the following formula:

$$Ak=Lo—Ae$$

Wherein Ak is a keto type acidic nucleus, Ae is an enol type acidic nucleus, and Lo is a methine chain consisting of an odd number of methine units.

The oxonol dye represented by the following formula (2) can be preferably used, particularly in the associated state:

$$\underset{O}{\overset{Y^1}{\cdots}}{=}L^2{\cdots}\underset{\overset{\ominus}{O}}{\overset{Y^2}{\cdots}} \quad X^{2\oplus} \quad (2)$$

wherein $Y^1$ and $Y^2$ are each independently a nonmetallic atomic group forming an aliphatic ring or a heterocycle. The heterocycle is preferred to the aliphatic ring. Examples of the aliphatic rings include an indandione ring. Examples of the heterocycles include a 5-pyrazolone ring, an isoxazolone ring, a barbituric acid ring, a pyridone ring, a rhodanine ring, a pyrazolidinedione ring, a purazolidone ring and a Meldrum's acid ring. The aliphatic groups and the heterocycles may have substituent groups. The substituent groups are the same as the above-mentioned substituent groups for the nitrogen-containing heterocycles of $Z^1$ and $Z^2$. The 5-pyrazolone ring and the barbituric acid ring are preferred.

$L^2$ is a methine chain consisting of an odd number of methine units. The number of methine units is preferably 3, 5 or 7, and most preferably 5. The methine group may have a substituent group, preferably at the center (at the meso position). Examples of the substituent groups are the same as the above-mentioned substituent groups for the alkyl groups. Two substituent groups of the methine chain may combine with each other to form a 5- or 6-membered ring.

$X^2$ is a hydrogen atom or a cation. Examples of the cations include alkaline metal (e.g., Na, K) ions, an ammonium ion, a triethylammonium ion, a tributylammonium ion, a pyridinium ion and a tetrabutylammonium ion.

Examples of the oxonol dyes represented by formula (2) are shown below:

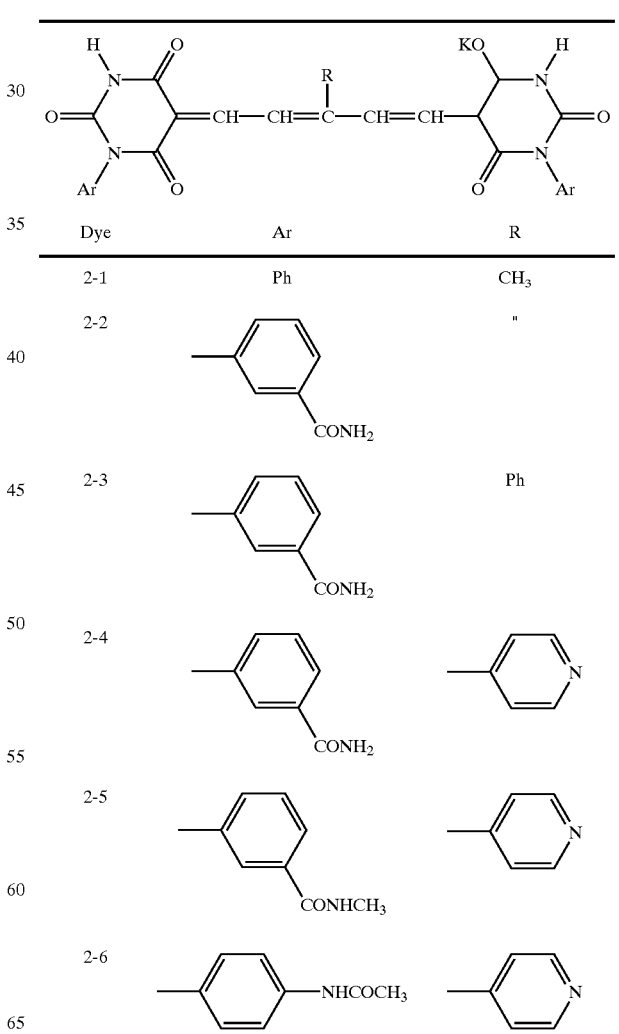

-continued 2-7 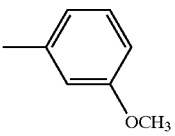

2-8 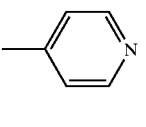

2-9 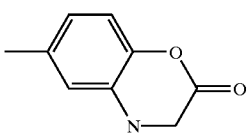

2-10 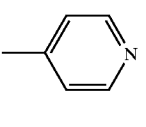

2-11 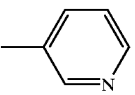

2-12 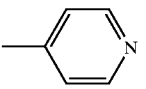

2-13 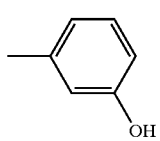

2-14 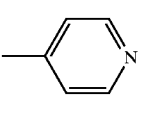

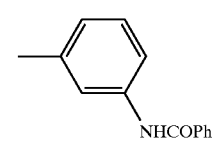

| Compound | R | R' |
|---|---|---|
| 2-15 | Ph | CONH$_2$ |
| 2-16 | C$_2$H$_5$ | " |
| 2-17 | " | CONHCH$_3$ |

It is more preferred that the oxonol dyes of formula (2) is used for 750 nm to 850 nm, and that the cyanine dyes of formula (1) are used for 851 nm to 950 nm and 951 nm to 1100 nm.

[Visible Light Absorption Layers]

The optical filter of the invention can be provided with the visible light absorption layer selectively absorbing light having a specified wavelength, as already described.

It is preferred that the visible light absorption layer has an absorption maximum (a transmittance minimum) in the wavelength region of 560 nm to 620 nm. The absorption maximum is preferably in the wavelength region of 570 nm to 600 nm, and most preferably in the wavelength region of 580 nm to 600 nm. The transmittance at the absorption maximum is preferably from 0.01% to 90%, and more preferably from 0.1% to 70%. The wavelength of the absorption maximum is can also be shifted by irradiation of light.

As to the absorption maximum in the wavelength region of 560 nm to 620 nm, it is preferred that a peak of the absorption spectrum is sharpened for selectively cutting light so as to exert as little influence on luminescence of the green fluorescent substances as possible. The half value width at the absorption maximum in the wavelength region of 560 nm to 620 nm is preferably from 5 nm to 70 nm, more preferably from 10 nm to 50 nm, and most preferably from 10 nm to 30 nm.

The optical filter of the invention may also have an absorption maximum in the wavelength region of 500 nm to 550 nm, in addition to the absorption maximum in the wavelength region of 560 nm to 620 nm. The transmittance at the absorption maximum within the wavelength range of 500 nm to 550 nm is preferably from 20% to 85%.

The absorption maximum in the wavelength region of 500 nm to 550 nm is established for adjusting the luminous intensity of green fluorescent substances high in visibility. It is preferred that the luminous region of the green fluorescent substances is smoothly cut. The half value width at the absorption maximum in the wavelength region of 500 nm to 550 nm (the width of a wavelength region showing half an absorbance at the absorption maximum) is preferably from 30 nm to 300 nm, more preferably from 40 nm to 300 nm, still more preferably from 50 nm to 150 nm, and most preferably from 60 nm to 150 nm.

For imparting the above-mentioned absorption spectrum to the light absorption layers, the use of coloring matter (dyes or pigments) is preferred.

As dyes having the absorption maximum in the wavelength region of 500 nm to 550 nm, there are preferably used squarilium dyes, azomethine dyes, cyanine dyes, oxonol dyes, anthraquinone dyes, azo dyes, benzylidene dyes or lake pigments converted therefrom. Examples of the dyes having the absorption maximum in the wavelength region of 500 nm to 550 nm are shown below:

(a1)

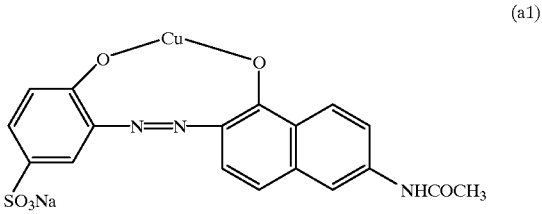

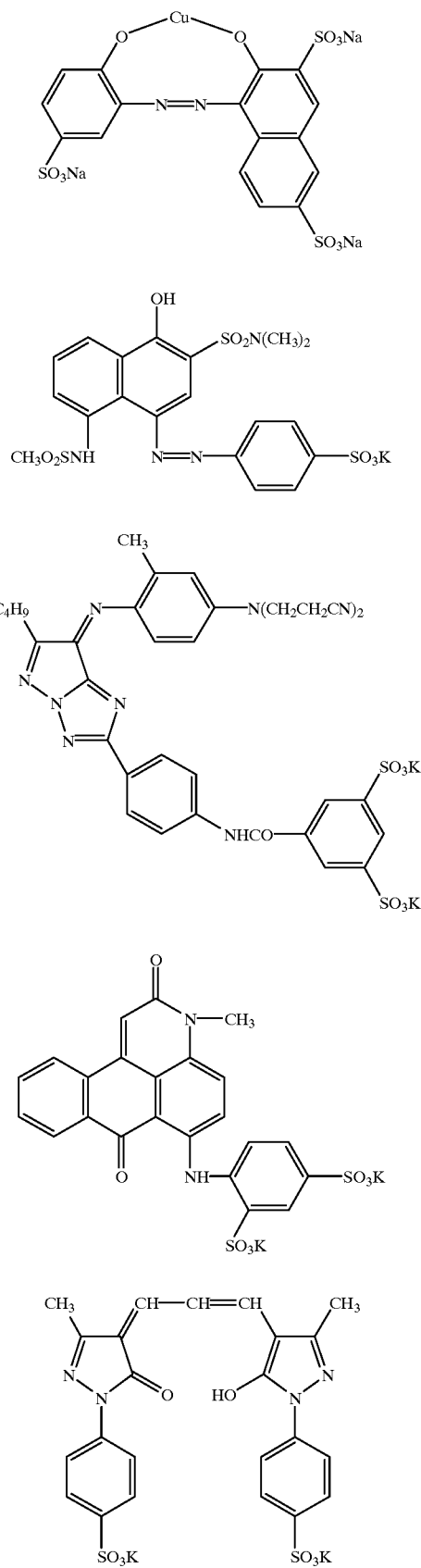
As dyes having the absorption maximum in the wavelength region of 560 nm to 620 nm, there are preferably used cyanine dyes, squarilium dyes, azomethine dyes, xanthene dyes, oxonol dyes, azo dyes or lake pigments converted therefrom. Examples of the dyes having the absorption maximum in the wavelength region of 560 nm to 620 nm are shown below:

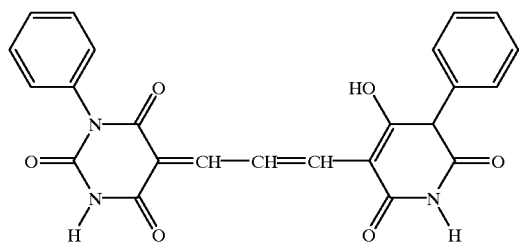
(b1)
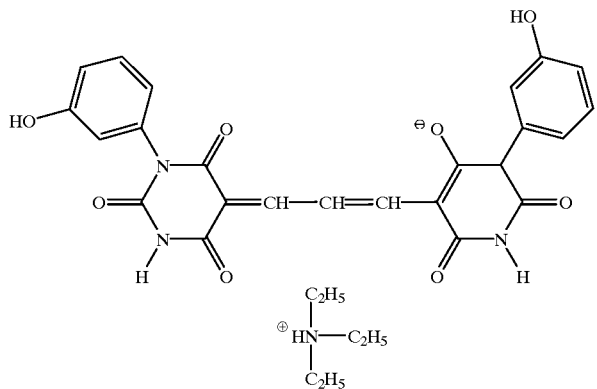
(b2)
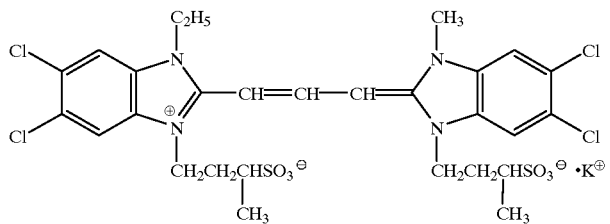
(b3)
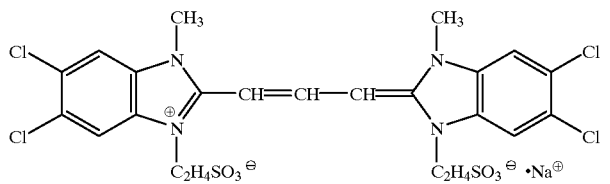
(b4)
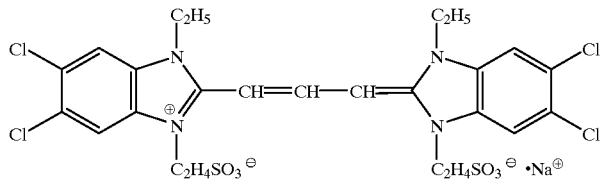
(b5)
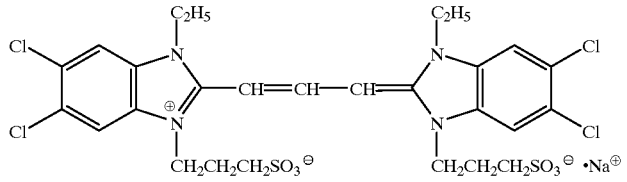
(b6)

-continued
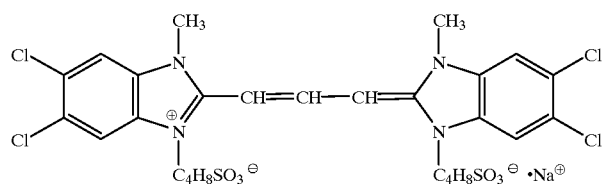
(b7)
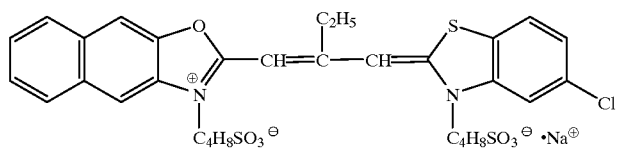
(b8)
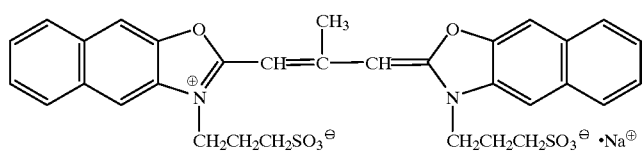
(b9)
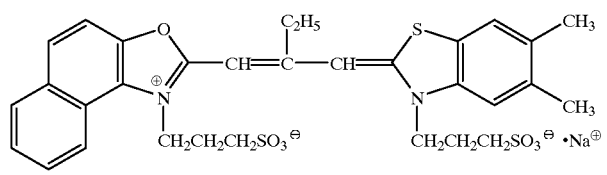
(b10)
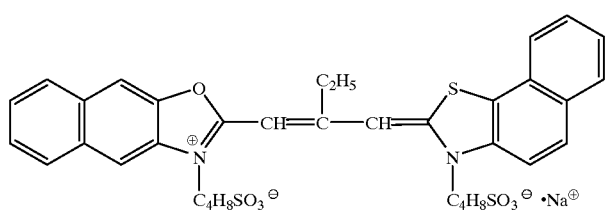
(b11)
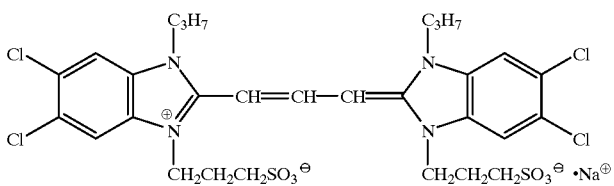
(b12)
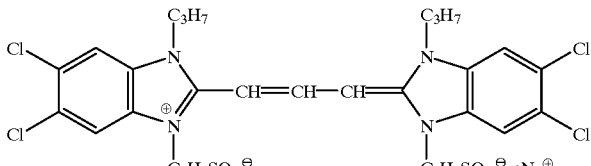
(b13)
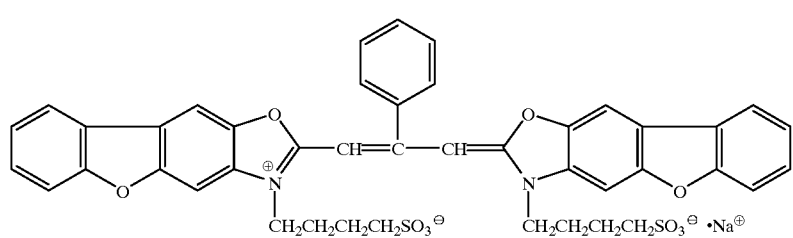
(b14)

(b15)
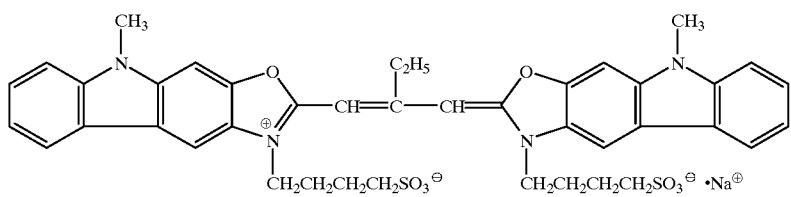

(b16)
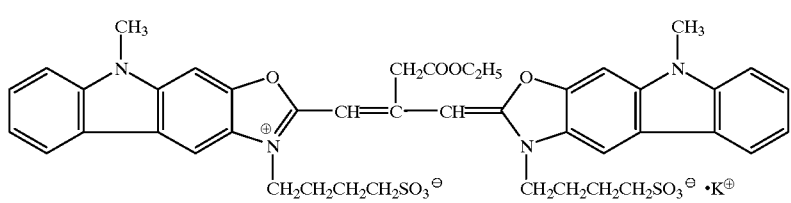

(b17)
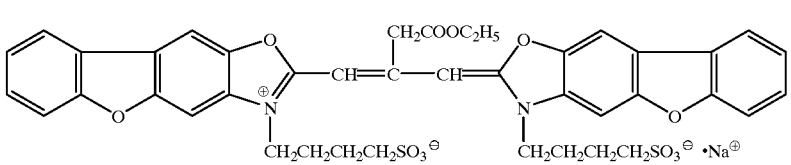

Further, it is preferred that the filter of the invention has an absorption maximum (a transmittance minimum) in the wavelength region of 380 nm to 440 nm. Preferred examples of the dyes having the absorption in the wavelength region of 380 nm to 440 nm include methine dyes, anthraquinone dyes, quinone dyes, diphenylmethane dyes, triphenylmethane dyes, xanthene dyes, azo dyes and azomethine compounds. The methine dyes are cyanine dyes, merocyanine dyes, oxonol dyes, allylidene dyes and styryl dyes. Specific examples thereof are described below:

(c1)
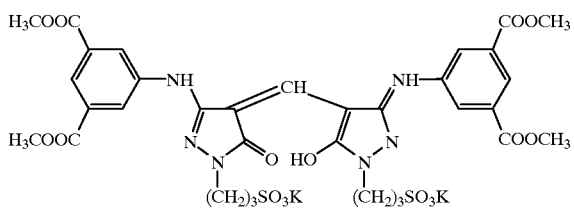

(c2)
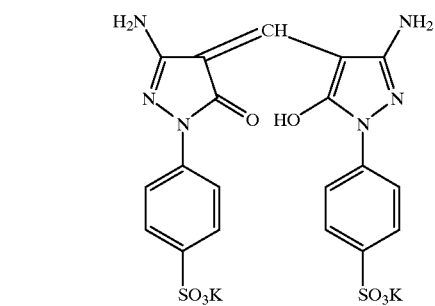

(c3)
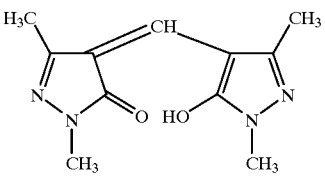

(c4)
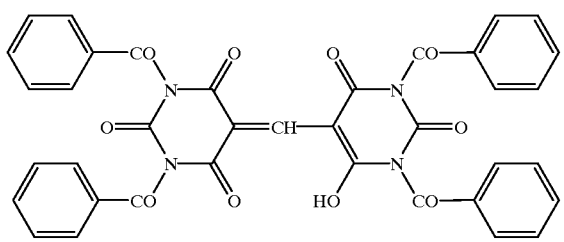

In the visible light absorption layer, two or more kinds of dyes can be used in combination.

The thickness of the visible light absorption layer is preferably from 0.1 $\mu$m to 5 cm, more preferably from 0.5 $\mu$m to 100 $\mu$m, and most preferably from 1 $\mu$m to 15 $\mu$m.

Although the visible light absorption layers can be formed by the dyes alone, they can contain polymer binders for controlling the stability and reflectance characteristics of the dyes.

As the above-mentioned polymer binder, gelatin is preferred. Besides, acrylic binders, urethane binders, SBR binders, olefin binders, vinylidene chloride binders, vinyl acetate binders, polyester binders or copolymers thereof are preferably used. The polymers maybe straight-chain polymers, branched polymers or crosslinked polymers.

Further, they may be so-called homopolymers in which only one kind of monomer is polymerized, or copolymers in which two or more kinds of monomers are polymerized. The copolymers may be random copolymers or block copolymers. The molecular weight of the polymers is from 5000 to 1000000, and preferably from about 10000 to about 100000, by the number average molecular weight. Too low the molecular weight results in insufficient film strength, whereas too high unfavorably results in poor film forming properties.

In addition, specific examples of polymer latexes which can be used as the polymer binders for the visible light absorption layers include a methyl methacrylate/ethyl acrylate/methacrylic acid copolymer latex, a methyl methacrylate/2-ethylhexyl acrylate/styrene/acrylic acid copolymer latex, a styrene/butadiene/acrylic acid copolymer latex, a styrene/butadiene/divinylbenzene/methacrylic acid copolymer latex, a methyl methacrylate/vinyl chloride/acrylic acid copolymer latex and vinylidene chloride/ethyl acrylate/acrylonitrile/methacrylic acid copolymer latex. Such polymers are commercially available, and the following polymers can be utilized.

Antifading agents may be added to the visible light absorption layers. Examples of the antifading agents acting as stabilizing agents for the dyes include hydroquinone derivatives (described in U.S. Pat. Nos. 3,935,016 and 3,982,944), hydroquinone diether derivatives (described in U.S. Pat. No. 4,254,216 and JP-A-55-21004), phenol derivatives (described in JP-A-54-145530), spiroindan or methylenedioxybenzene derivatives (described in British Patents 2,077,455 and 3,573,050, and JP-A-61-90155), chroman, spirochroman or coumarin derivatives (described in U.S. Pat. Nos. 3,432,300, 3,573,050, 3,574,627 and 3,764,337, JP-A-52-152225, JP-A-53-20327, JP-A-53-17729 and JP-A-61-90156), hydroquinone monoether or p-aminophenol derivatives (described in British Patents 1,347,556 and 2,066,975), JP-B-54-12337 (the term "JP-B" as used herein means an "examined Japanese patent publication") and JP-A-55-6321), and bisphenol derivatives (described in U.S. Pat. No. 3,700,455 and JP-B-48-31625).

For improving the stability of the dyes against light or heat, metal complexes (described in U.S. Pat. No. 4,245,018 and JP-A-60-97353) may be used as the antifading agents.

Further, for improving the resistance to light of the dyes, singlet oxygen quenchers may be used as the antifading agents. Examples of the singlet oxygen quenchers include nitroso compounds (described in JP-A-2-300288), diimmoium compounds (described in U.S. Pat. No. 465,612), nickel complexes (described in JP-A-4-146189) and antioxidants (described in EP-A-820057).

[Electromagnetic Shielding Layers]

When electromagnetic waves emitted from displays are required to be shielded, transparent conductive layers are provided as the electromagnetic shielding layers.

There are methods of using laminates of layers of metals such as silver and metal oxides, thin metal films etched in a lattice pattern, and conductive meshes as the transparent conductive layers. However, the method of using laminates of layers of metals such as silver and metal oxides is preferred in respect to no occurrence of moire.

The surface resistivity of the transparent conductive layer is preferably 500 Ω/square or less, more preferably 50 Ω/square or less, and particularly preferably 3 Ω/square or less.

The transparent conductive layer may be provided either on the above-mentioned transparent support (B) or on another transparent support.

The above-mentioned laminates of layers of metals such as silver and metal oxides are preferably transparent. As a metal of the metal layer, one or an alloy of two or more selected from gold, silver, copper, platinum, rhodium, iridium and palladium is preferred, and an alloy of palladium and silver is particularly preferred. The content of silver in the alloy is 80% by weight or more. A metal oxide of the metal oxide layer is preferably one mainly composed of $TiO_2$, $SnO_2$, $ZnO$, ITO or $In_2O_3$, and $Ga_2O_3$ may be added thereto.

The lamination of the metal layer with the metal oxide layer can protect the metal layer with the metal oxide layer (oxidation prevention) and can increase the transmittance of visible light. The constitution of lamination is preferably support/(metal oxide layer/metal layer)n/metal oxide layer, wherein n is an integer of 1 or more, preferably an integer of 1 to 10, more preferably an integer of 1 to 7, and particularly preferably an integer of 1 to 5. Each of the metal layer and the metal oxide layer may be a laminate of two or more kinds of layers. Further, a layer for protecting the metal layer may be provided on the metal layer.

Furthermore, in the above-mentioned layer constitution, a thin layer of a metal alkoxide compound can also be laminated with the metal layer. The metal oxide layers and the metal alkoxide compound layers can be laminated on both faces of the metal layer. When laminated on both sides of the metal layer, different kinds of layers may be used.

The thickness of the metal layer is preferably from 5 nm to 60 nm, more preferably from 10 nm to 55 nm, and most preferably from 15 nm to 50 nm, in total.

The thickness of the metal oxide or metal alkoxide compound layer is preferably from 20 nm to 300 nm, and more preferably from 40 nm to 150 nm.

The metal layer can be formed by spattering, vacuum deposition, ion plating, plasma CVD, plasma PVD or coating of ultrafine particles of the metal or the metal oxide. Of these, the spattering is preferred.

Further, it is preferred that an overcoat layer having a thickness of 10 μm or less is formed on the transparent support to be sputtered, using an acrylic, urethane, epoxy or siloxane polymer, oligomer or monomer (for example, an ultraviolet curing resin), for preventing a plasticizer from evaporating from the support.

[Undercoat Layers]

An undercoat layer is preferably provided between the transparent support and a layer adjacent thereto.

The undercoat layer is formed as
 (a) a layer containing a polymer having a glass transition temperature of 25° C. or less,
 (b) a layer whose surface on the side of the adjacent layer is roughened, or
 (c) a layer containing a polymer having an affinity for a polymer of the adjacent layer.

The undercoat layer may be provided on the side of the transparent support on which no adjacent layer is formed to improve adhesion between the transparent support and a layer to be provide thereon (for example, an antireflection layer or a hard coat layer). Further, the undercoat layer may be provided for improving an affinity between the optical filter and an adhesive for adhering the optical filter to an image formation apparatus.

The thickness of the undercoat layer is preferably from 20 nm to 1000 nm, and more preferably from 80 nm to 300 nm.

Further, two or more undercoat layers may be provided.

The above-mentioned layer (a) containing a polymer having a glass transition temperature of 25° C. or less can be preferably used by adhering the transparent support to the adjacent layer by adhesion of the polymer.

The polymer having a glass transition temperature of 25° C. or less can be obtained by polymerization or copolymerization of vinyl chloride, vinylidene chloride, vinyl acetate, butadiene, neoprene, styrene, chloroprene, an acrylate, a methacrylate acrylonitrile or methyl vinyl ether.

The glass transition temperature is preferably 20° C. or less, more preferably 15° C. or less, still more preferably 10° C. or less, yet still more preferably 5° C. or less, and most preferably 0° C. or less.

The layer (b) whose surface is roughened makes it possible to easily adhere the transparent support to the adjacent layer by forming the adjacent layer on the roughened surface. The layer whose surface is roughened can be easily formed by coating of a polymer latex. The average particle size of the latex is preferably from 0.02 $\mu$m to 3 $\mu$m, and more preferably from 0.05 $\mu$m to 1 $\mu$m.

When the layer adjacent to the above-mentioned undercoat layer (c) containing a polymer having an affinity for a polymer of the adjacent layer is the visible light absorption layer, the polymer having an affinity for a binder polymer of the visible light absorption layer includes, for example, an acrylic resin, a cellulose derivative, gelatin, casein, starch, polyvinyl alcohol, soluble nylon and a polymer latex.

Antistatic agents may be added to the undercoat layers. In this case, the undercoat layers also serve as antistatic layers described later.

The antistatic agent may be imparted to either the above-mentioned undercoat layer or a second undercoat layer. Further, it may be imparted to either the undercoat layer on the antireflection layer side of the support or the undercoat on the opposite side. It is more preferred that the antistatic agent be imparted to both sides.

Furthermore, solvents for swelling the transparent supports, matte agents, surfactants, antistatic agents, coating aids and hardening agents may be added to the undercoating layers.

[Antireflection Layers]

The optical filter can be provided with an antireflection layer for preventing a reflection of external light. The reflectance (regular reflectance) of the optical filter provided with the antireflection layer is preferably 3.0% or less, and more preferably 1.8% or less.

Usually, a low refractive layer is provided as the antireflection layer. The low refractive layer has a lower refractive index than that of a layer provided thereunder. The refractive index of the low refractive layer is preferably from 1.20 to 1.55, and more preferably from 1.20 to 1.50. The thickness of the low refractive layer is preferably from 50 nm to 400 nm, and more preferably from 50 nm to 200 nm.

Examples of the low refractive layers include layers composed of fluorine-containing polymers having a low refractive index (described in JP-A-57-34526, JP-A-3-130103, JP-A-115023, JP-A-8-313702 and JP-A-7-168004), layers obtained by the sol-gel process (described in JP-A-5-208811, JP-A-6-299091 and JP-A-7-168003), and layers containing fine particles (described in JP-B-60-59250, JP-A-5-13021, JP-A-6-56478, JP-A-7-92306 and JP-A-9-288201). According to the layers containing fine particles, voids can be formed in the low refractive layers as micro voids between or in the fine particles. The layers containing fine particles have preferably a percentage of voids of 3% to 50% by volume, and more preferably a percentage of voids of 5% to 35% by volume.

For preventing reflection in a wide wavelength region, the low refractive layer is preferably laminated with a layer having a high refractive index (medium or high refractive layer).

The refractive index of the high refractive layer is preferably from 1.65 to 2.40, and more preferably from 1.70 to 2.20. The refractive index of the medium refractive layer is adjusted so as to give an intermediate value between the refractive index of the high refractive layer and that of the low refractive layer. The refractive index of the medium refractive layer is preferably from 1.50 to 1.90.

The thickness of the medium or high refractive layer is preferably from 5 nm to 100 $\mu$m, more preferably from 10 nm to 10 $\mu$m, and most preferably from 30 nm to 1 $\mu$m.

The haze of the medium or high refractive layer is preferably 5% or less, more preferably 3% or less, and most preferably 1% or less.

The medium or high refractive layer can be formed by using a polymer having a relatively high refractive index. Examples of the polymers having a high refractive index include polystyrene, styrene copolymers, polycarbonates, melamine resins, phenol resins, epoxy resins and polyurethanes obtained by the reaction of cyclic (alicyclic or aromatic) isocyanates with polyols. Other polymers having cyclic (aromatic, heterocyclic or alicyclic) groups and polymers having halogen atoms other than fluorine as substituent groups are also high in the refractive index. Polymers may also be formed by the polymerization reaction of monomers in which the introduction of double bonds enables radical curing.

For obtaining a higher refractive index, fine inorganic particles may be dispersed in the polymer binders. The refractive index of the fine inorganic particles is preferably from 1.80 to 2.80. The fine inorganic particles are preferably formed from metal oxides or sulfides. Examples of the metal oxides or sulfides include titanium oxide (e.g., rutile structure, mixed crystals of rutile/anatase, anatase structure, amorphous structure), tin oxide, indium oxide, zinc oxide, zirconium oxide and zinc sulfide. Particularly preferred are titanium oxide, tin oxide and indium oxide. The fine inorganic particles contain these metal oxides or sulfides as main components, and can further contain other elements. The term "main component" means a component whose content (% by volume) is the highest of the components constituting the particles. Examples of the other elements include Ti, Zr, Sn, Sb, Cu, Fe, Mn, Pb, Cd, As, Cr, Hg, Zn, Al, Mg, Si, P and S.

The medium or high refractive layer can also be formed using an inorganic material which is coating-formable and solvent-dispersible or which is liquid itself. Examples of the inorganic materials include alkoxides of various kinds of elements, salts of organic acids, coordination compounds combined with compounds having coordination properties (e.g., chelate compounds) and active inorganic polymers.

[Antiglare Layers]

The optical filter of the invention is also preferably provided with an antiglare layer on its surface to form unevenness. As to the cross-sectional form of convex portions, it is preferred that slopes gently extend from roundish vertexes to the peripheries thereof. The slopes are preferably convex upward in the vicinities of the vertexes, and convex downward in the other portions. The vertexes may be either acute or flat. The form of the convex portions observed from the upside is preferably circular or elliptical. However, it may be triangular, quadrilateral, hexagonal or complicated. The form of the convex portions is indicated by outlines of valleys surrounding the peripheries of the convex portions. The size of the convex portions indicated by the outlines is preferably from 0.5 $\mu$m to 300 $\mu$m, more preferably from 1 $\mu$m to 30 $\mu$m, and most preferably from 3 $\mu$m to 20 $\mu$m, by the circle-corresponding diameter.

The unevenness on the surface can be formed by calender pressing with a calender roll having unevenness, formation of a layer by coating a support with a solution containing a matrix and particles, and drying it (curing it as needed), printing, lithography or etching. The method of coating a support with a solution containing a matrix and particles is preferred.

A compound used as the above-mentioned matrix is preferably a polymer having a saturated hydrocarbon or a polyether as a main chain, and more preferably a polymer having a saturated hydrocarbon as a main chain. It is preferred that the polymer is crosslinked. The polymer having a saturated hydrocarbon as a main chain is preferably obtained by the polymerization reaction of an ethylenic unsaturated monomer. For obtaining the crosslinked binder polymer, the use of a monomer having two or more ethylenic unsaturated groups is referred.

Examples of the monomers each having two or more ethylenic unsaturated groups include esters of polyhydric alcohols and (meth)acrylic acid (e.g., ethylene glycol (meth) acrylate, 1,4-dichlorohexane diacrylate, pentaerythritol tetra (meth)acrylate, pentaerythritol (meth) acrylate, trimethylolpropane tri(meth)acrylate, trimethylolethane tri-(meth) acrylate, dipentaerythritol tetra(meth)acrylate, dipentaerythritol penta(meth)acrylate, pentaerythritol hexa(meth) acrylate, 1,2,3-cyclohexane tetramethacrylate, polyurethane polyacrylate, polyester polybenzoic acid-2-acryloyl ethyl ester, 1,4-divinylcyclohexanone), vinyl sulfone compounds (e.g., divinyl sulfone), acrylamide compounds (e.g., methylenebisacrylamide) and methacrylamide.

The ethylenic unsaturated group-containing monomers are preferably cured by the polymerization reaction by ionizing radiations or heat after coating.

The polymers having polyethers as main chains are preferably synthesized by the ring-opening polymerization reaction of multifunctional epoxy compounds.

Crosslinkable group-containing compounds may be used in place of the monomers each having two or more ethylenic unsaturated groups, or in addition thereto. The crosslinking structure can also be introduced into the binder polymers by the reaction of crosslinkable groups. Examples of the crosslinkable groups include an isocyanate group, an epoxy group, an aziridine group, an oxazoline group, an aldehyde group, a carbonyl group, a hydrazine group, a carboxyl group, a methylol group and an active methine group. They further include a vinyl sulfone group, an acid anhydride, a cyanoacrylate derivative, melamine, etherified methylol, an ester linkage and a urethane linkage. Metal alkoxides such as tetramethoxysilane can also be utilized as monomers for introducing the crosslinking structure. Functional groups showing crosslinking ability as a result of the degradation reaction, such as blocked isocyanate groups, may be used. Further, the crosslinking groups may be functional groups showing reactivity as a result of degradation. The compounds having crosslinking ability are preferably crosslinked by heat after coating.

As the particles for forming unevenness, there are used inorganic particles or organic particles. Examples of materials for forming the inorganic particles include silicon dioxide, titanium dioxide, magnesium oxide, calcium carbonate, magnesium carbonate, barium sulfate and strontium sulfate. The organic particles are generally formed of polymers. Examples of the polymers include polymethyl acrylate, polymethyl methacrylate, polyacrylonitrile, polystyrene, cellulose acetate and cellulose acetate propionate. The inorganic particles are preferred to the organic particles, and polymethyl methacrylate or polystyrene particles are particularly preferred. the average size of the particles is preferably from 0.5 $\mu$m to 30 $\mu$m, and more preferably from 1 $\mu$m to 3 $\mu$m. Two or more kinds of particles different in material for forming the particles or in size may be used in combination.

It is preferred that the average thickness of the layer having the surface on which unevenness is formed is smaller than the average size of the particles.

The optical filter of the invention can also be provided with a hard coat layer, a lubricating layer, an antistatic layer or an intermediate layer.

[Hard Coat Layers]

The hard coat layer is provided for imparting strength to the optical filter as desired. It is preferred that the hard coat layer contains a crosslinked polymer. The hard coat layer can be formed using an acrylic, urethane, epoxy or siloxane polymer, oligomer or monomer (for example, an ultraviolet curing resin). A silica filler can also he added to the hard coat layer.

[Lubricating Layers]

The lubricating layer maybe formed on the antireflection layer (usually, the low refractive layer). The lubricating layer has the functions of imparting lubricity to the surface of the antireflection layer and improving flaw resistance. The lubricating layer can be formed using a polyorganosiloxane (e.g., silicone oil), natural wax, petroleum wax, a metal salt of a higher fatty acid, a fluorine lubricating agent or a derivative thereof. The thickness of the lubricating layer is preferably from 2 nm to 20 nm.

[Antistatic Layers]

The antistatic layer can be formed for imparting antistatic properties to the optical filter. The antistatic layer is usually formed on the antireflection layer side of the transparent support.

The antistatic layers can be formed by dispersing conductive materials described below, together with binders, and applying the resulting dispersions.

Preferred examples of the antistatic conductive materials and binders include antistatic conductive materials and binders used in imparting antistatic properties to the above-mentioned undercoat layers to allow the undercoat layers to serve as antistatic layers.

The antistatic conductive materials preferably used are crystalline metal oxide particles. In general, inclusion of oxygen defects and inclusion of dissimilar atoms forming donors to the metal oxide in small amounts elevates conductivity, so that they are particularly preferred.

Preferred examples of the metal oxides include ZnO, $TiO_2$, $SnO_2$, $Al_2O_3$, $In_2O_3$, $SiO_2$, MgO, BaO, $MoO_3$, $V_2O_5$ and mixed oxides thereof, and particularly preferred are ZnO, $In_2O_3$, $V_2O_5$ and $SnO_2$. As to the inclusion of dissimilar atoms, for example, addition of Al or In to ZnO, addition of Sb, Nb, P or a halogen atom to $SnO_2$, and addition of Nb or Ta to $TiO_2$ are effective. The amount of these dissimilar atoms added is preferably from 0.01 mol % to 30 mol %, and particularly preferably from 0.1 mol % to 10 mol %. Further, for improving fine particle dispersibility and transparency, a silicon compound may be added in forming the fine particles.

The above-mentioned fine metal oxide particles have conductivity, and the volume resistivity thereof is from $10^7$ $\Omega$-cm or less, and particularly $10^5$ $\Omega$-cm or less.

These oxides are described in JP-A-56-143431, JP-A-56-120519, JP-A-58-62647 and JP-A-4-79104.

Further, as described in JP-B-59-6235, conductive materials may be used in which the above-mentioned metal oxides are allowed to adhere to particles or fibrous materials of other crystalline metal oxides (for example, titanium oxide). The available primary particle size is preferably from 0.0001 µm to 1 µm. However, when the size is 0.001 µm to 0.5 µm, stability after dispersion is improved to make the particles easy to use. Furthermore, for minimizing light scattering, the use of conductive particles having a size of 0.001 µm to 0.3 µm is very preferred, because the formation of transparent materials becomes possible. These particles are usually secondary aggregates formed by association of several or more primary particles in dispersions or coating films, and the particle size thereof is from 0.01 µm to 0.3 µm, and preferably from 0.03 µm to 0.2 µm.

Further, when the conductive materials are acicular or fibrous, the length thereof is preferably 30 µm or less, and the diameter thereof is preferably 1 µm or less. Particularly preferred are the conductive materials having a length of 10 µm or less, a diameter of 0.3 µm or less, and a length/diameter ratio of 3 or more.

The antistatic metal oxides are preferably applied together with the binders. Examples of the binders include but are not limited to water-soluble binders such as gelatin, dextran, polyacrylamide, starch and polyvinyl alcohol, and synthetic polymer binders such as poly(meth)acrylates, polyvinyl acetate, polyurethanes, polyvinyl chloride, polyvinylidene chloride, styrene/butadiene copolymers, polystyrene, polyesters, polyethylene, polyethylene oxide, polypropylene and polycarbonates. The synthetic polymer binders may be used either together with organic solvents or as aqueous dispersions.

Further, these metal oxides may be used as a combination of spherical and fibrous ones.

The content of the antistatic metal oxide is 0.0005 g/m$^2$ or more, more preferably from 0.0009 g/m$^2$ to 0.5 g/m$^2$, and particularly preferably from 0.0012 g/m$^2$ to 0.3 g/m$^2$.

The surface resistivity of the antireflection layer as the final form is generally in the range of $10^2$ µ/square to $10^{12}$ Ω/square, preferably in the range of $10^6$ Ω/square to $10^{12}$ Ω/square, and more preferably in the range of $10^9$ Ω/square to $10^{12}$ Ω/square. When the surface resistivity of the antireflection layer exceeds $10^{12}$ Ω/square, the adhesion of dust can not be prevented because of its insufficient antistatic function. On the other hand, in order to lower the surface resistivity to less than $10^2$ Ω/square, the conductive metal oxide must be added in large amounts, which impractically causes the film quality of the undercoat layer to be deteriorated, decreases the adhesive strength of the low refractive layer, and raises the haze of the antireflection layer too high.

[Formation of Respective Layers and Uses of Optical Filters]

The various layers of the optical filter described above, excluding the electromagnetic shielding layer, can be formed by general coating methods. Examples of the coating methods include dip coating, air knife coating, curtain coating, roller coating, wire bar coating, gravure coating and extrusion coating using a hopper (described in U.S. Pat. No. 2,681,294). Wire bar coating, gravure coating and extrusion coating are preferred.

Two or more layers may be formed by simultaneous coating. The simultaneous coating methods are described in U.S. Pat. Nos. 2,761,791, 2,941,898, 3,508,947 and 3,526,528, and Yuji Harazaki, "Coating Engineering", page 253, Asakura Shoten (1973).

Additives such as polymer binders, hardening agents, surfactants and pH adjusting agents can be added to coating solutions for the respective layers.

The electromagnetic shielding layer can be formed by spattering, vacuum deposition, ion plating, plasma CVD or plasma PVD. These have already been described.

The elastic modulus of the optical filter (laminate) of the invention is preferably 3.5 GPa or less, and more preferably from 1 GPa to 3.5 GPa. When the filter is directly adhered to a display, the elastic modulus within this range affords practically sufficient strength to a surface of the display.

For adjusting the elastic modulus of the optical filter (laminate) of the invention to the above-mentioned range, it can be adjusted by any combination of the material and thickness of the transparent support.

The optical filters of the present invention are used in image displays such as a liquid crystal display (LCD), a plasma display panel (PDP), an electroluminescence display (ELD) and a cathode ray tube display (CRT). The optical filters according to the invention achieve a marked effect, when used in the plasma display panel (PDP) or the cathode ray tube display (CRT), particularly in the plasma display panel (PDP).

The plasma display panel (PDP) is generally composed of a gas, glass substrates, electrodes, electrode lead materials, thick-film print materials and a fluorescent substance. The glass substrates are two of a front glass substrate and a back glass substrate. The electrodes and insulating layers are formed on the two glass substrates. The fluorescent substance layer is further formed on the back glass substrate. The two glass substrates are assembled, and the gas is sealed between them.

The plasma display panels (PDPs) are already commercially available, and described in JP-A-5-205643 and JP-A-9-306366.

Usually, for protecting the plasma display panels, front plates are arranged in front of the plasma display panels. However, the optical filter of the invention can be used by direct adhesion to a main body of the plasma display, and prevents damage to a screen of an image display such as the plasma display panel and maintains safety in damage.

The present invention will be further illustrated in greater detail with reference to the following examples, which are, however, not to be construed as limiting the invention.

EXAMPLE

EXAMPLE 1

[Formation of Laminate (A)]

(1) Formation of Undercoat and Antistatic Layer

One face of a 175-µm thick transparent support (biaxially oriented polyethylene terephthalate film having a volume resistivity of $10^{18}$ Ω/cm) was subjected to a corona treatment, and then, a mixture of a latex comprising a styrene-butadiene copolymer having a refractive index of 1.55 and a glass transition temperature of 37° C. (LX407C5, manufactured by Nippon Zeon Co., Ltd) and a mixed oxide of tin oxide/antimony oxide (FS-10D, manufactured by Ishihara Sangyo Kaisha, Ltd.) at a ratio of 5:5 by weight was applied thereon so as to give a film thickness of 200 nm after drying, thereby forming an undercoat layer also serving as an antistatic layer.

(2) Formation of Hard Coat Layer

A 48 wt % dispersion of zirconium oxide in a mixture of methyl ethyl ketone/cyclohexanone of a weight ratio of 1/1 by weight (37.2 g), 4.46 g of dipentaerythritol hexa acrylate (DPHA, manufactured by Nippon Kayaku Co., Ltd.) and 1.17 g of a photopolymerization initiator (Irgacure 907, manufactured by Ciba Geigy Corporation) were mixed to prepare a solution.

The above-mentioned solution was applied onto the undercoat layer also serving as the antistatic layer with a wire bar so as to give a dry film thickness of 6 μm, dried, and irradiated with ultraviolet rays to harden it.

(3) Formation of Antireflection Layer t-Butanol (1.5 g) was added to 2.50 g of a reactive fluorine polymer (JN-7219, manufactured by JSR Corporation), followed by stirring at room temperature for 10 minutes. The resulting solution was filtered through a 1-μm polypropylene filter to prepare a coating solution. This solution was applied onto the hard coat layer formed in (2) described above with a bar coater so as to give a dry film thickness of 90 nm, and dried at 120° C. for 3 minutes to obtain laminate (A).

[Formation of Laminate (B)]

(1) Formation of Undercoat Layer

One face of a 250-μm thick transparent support (biaxially oriented polyethylene terephthalate film having a volume resistivity of $10^{18}$ Ω/cm) was subjected to a corona treatment, and then, a latex comprising a styrene-butadiene copolymer having a refractive index of 1.55 and a glass transition temperature of 37° C. (LX407C5, manufactured by Nippon Zeon Co., Ltd.) was applied thereon so as to give a film thickness of 300 nm, before formation of a visible light absorption layer and an infrared screening filter layer, thereby forming an undercoat layer.

(2) Formation of Visible Light Absorption Layer and Infrared Absorption Layer (Filter Layer)

A 1 N solution of sodium hydroxide was added to 180 g of a 10 wt % aqueous solution of gelatin to provide pH 7, and 15 mg/m² of the following dye 1, 24.5 mg/m² of compound 2-7, 45.9 mg/M² of compound 1-12, 29.1 mg/m² of compound 1-13 and 120 mg/m² of the following dye 2 were added thereto, followed by stirring at 30° C. for 24 hours to prepare a coating solution for a filter layer.

The coating solution thus obtained was applied onto the undercoat layer formed in (1) described above so as to give a dry film thickness of 3.5 μm, and dried at 120° C. for 10 minutes to prepare laminate (B).

mum at 810 nm was 5%, the transmittance at the absorption maximum at 905 nm was 1%, and the transmittance at the absorption maximum at 983 nm was 3%.

[Preparation of Laminated Optical Filters]

Laminate (A), laminate (B) and a 175-μm thick transparent support (biaxially oriented polyethylene terephthalate film: PET) were laminated using an acrylic adhesive to prepare optical filters F11 to F13. The constitution of the filters thus prepared is shown in Table 1.

In all optical filters, laminate (A) was laminated so that the antireflection layer was situated on the viewer side.

TABLE 1

|  | Optical Filter (Invention) | | |
| --- | --- | --- | --- |
|  | F11 | F12 | F13 |
| Layer Closest to Viewer | Laminate (A) | Laminate (B) | Laminate (A) |
| Layer under the Above | Laminate (B) | Laminate (B) | PET |
| Layer under the above | Not used | PET | Laminate (B) |

PET: Polyethylene terephthalate

Optical filters F14 to F16 shown in Table 2 were similarly prepared for comparison.

TABLE 2

|  | Optical Filter (Comparison) | | |
| --- | --- | --- | --- |
|  | F11 | F12 | F13 |
| Layer Closest to Viewer | Laminate (A) | Laminate (B) | PET |
| Layer under the Above | Not used | Not used | PET |

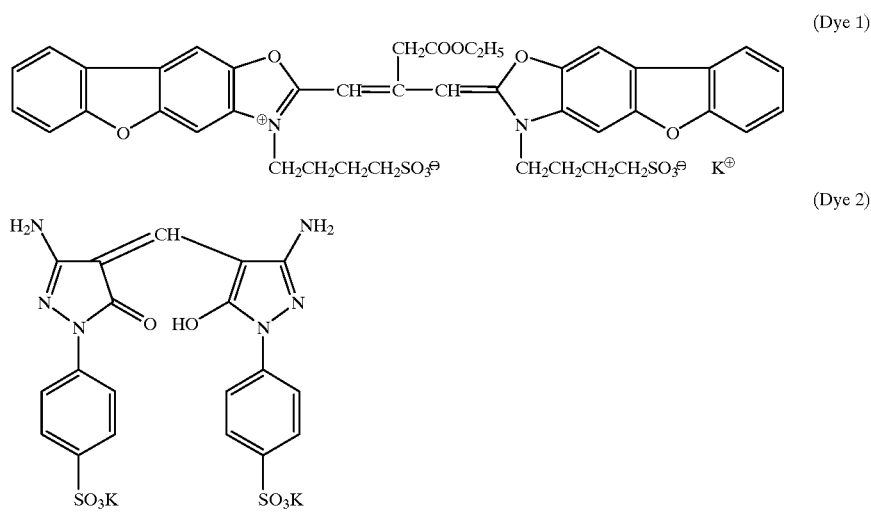

(Dye 1)

(Dye 2)

Examination of the spectral transmittance for laminate (B) thus prepared revealed that laminate (B) had absorption maximums at 400 nm, 593 nm, 810 nm, 904 nm and 985 nm. The transmittance at the absorption maximum at 400 nm was 35%, the transmittance at the absorption maximum at 593 nm was 30%, the transmittance at the absorption maxi-

TABLE 2-continued

| | Optical Filter (Comparison) | | |
|---|---|---|---|
| | F11 | F12 | F13 |
| Layer under the above | Not used | Not used | Not used |

Each of these optical filters was adhered to a glass plate having a thickness of 3 mm, and struck with hummer to damage it. Then, the state of each filter was evaluated. Further, each filter was directly adhered to a plasma display, and the hues and the near infrared transmittance in the region of 800 to 900 nm were evaluated. Results thereof are shown in Table 3.

TABLE 3

| | Optical Filter | | | | | |
|---|---|---|---|---|---|---|
| | Invention | | | Comparison | | |
| | F11 | F12 | F13 | F14 | F15 | F16 |
| Evaluation in Glass Damage | Fair | Good | Good | Poor | Poor | Good |
| Evaluation of Hues | Good | Good | Good | Good | Poor | Poor |
| Evaluation of Infrared Transmittance | Good | Good | Good | Poor | Fair | Poor |
| Reflectance | Good | Good | Good | Good | Poor | Poor |

Evaluation in Glass Damage
  Good: No breakage is developed in an optical filter.
  Fair: An optical filter breaks, and glass projects therefrom at 3 or less portions.
  Poor: An optical filter breaks, and glass projects therefrom at 4 or more portions.
Evaluation of Hues (Visual Observation)
  Good: Both white light and red light are effectively improved.
  Poor: Greenish white and orange tinged red are observed.
Evaluation of Infrared Transmittance
  Good: All the transmittances at 800 nm to 820 nm, 890 nm to 910 nm and 970 nm to 990 nm are 20% or less.
  Poor: All exceed 20%.
Evaluation of Reflectance
  Good: The average reflectance at 450 nm to 650 nm is less than 1.5%.
  Poor: The average reflectance at 450 nm to 650 nm is 1.5% or more.
[Optical Filter F17 for Comparison]

Similarly, an antistatic layer, a hard coat layer and an antireflection layer were provided on one face of the transparent support used in optical filter F11, and a visible light absorption layer and an infrared absorption layer were provided on the opposite face thereof to prepare a laminate (optical filter F17).

The yield of optical filter F11 of the invention composed of laminate (A) and laminate (B) was 85%, and the yield of optical filter F17 for comparison was 65%.

The yield used herein was calculated from the number of acceptable filters to the number of sheets of transparent support (A), when 100 optical filters were continuously prepared.

From these results, it is clear that the optical filters of the invention are excellent in production yields, and satisfy safety to incised wounds in glass damage, improvements in color and infrared shielding properties at the same time, when applied to image displays.

EXAMPLE 2

[Formation of Laminate (A)]

(1) Formation of Undercoat Layer and Antistatic Layer]

Both faces of a 175-μm thick transparent support (biaxially oriented polyethylene terephthalate film) were subjected to a corona treatment. Then, a latex comprising a styrene-butadiene copolymer having a refractive index of 1.55 and a glass transition temperature of 37° C. (LX407C5, manufactured by Nippon Zeon Co., Ltd) was applied onto the back face thereof on which a visible light absorption layer and an infrared screening filter layer are provided, so as to give a film thickness of 300 nm, thereby forming an undercoat layer.

A mixture of a latex comprising a styrene-butadiene copolymer having a refractive index of 1.55 and a glass transition temperature of 37° C. (LX407C5, manufactured by Nippon Zeon Co., Ltd) and a mixed oxide of tin oxide/antimony oxide (FS-10D, manufactured by Ishihara Sangyo Kaisha, Ltd.) at a ratio of 5:5 by weight was applied onto the front face, the opposite face, so as to give a film thickness of 200 nm after drying, thereby forming an undercoat layer also serving as an antistatic layer.

(2) Formation of Hard Coat Layer

A 48 wt % dispersion of zirconium oxide in a mixture of methyl ethyl ketone/cyclohexanone of a weight ratio of 1/1 by weight (37.2 g), 4.46 g of dipentaerythritol hexaacrylate (DPHA, manufactured by Nippon Kayaku Co., Ltd.) and 1.17 g of a photopolymerization initiator (Irgacure 907, manufactured by Ciba Geigy Corporation) were mixed to prepare a solution for forming a hard coat layer.

The above-mentioned solution was applied onto the undercoat layer also serving as the antistatic layer formed on the front face in (1) described above, with a wire bar so as to give a dry film thickness of 6 μm, dried, and irradiated with ultraviolet rays to harden it, thereby forming a hard coat layer.

(3) Formation of Antireflection Layer t-Butanol (1.5 g) was added to 2.50 g of a reactive fluorine polymer (JN-7219, manufactured by JSR Corporation), followed by stirring at room temperature for 10 minutes. The resulting solution was filtered through a 1-μm polypropylene filter to prepare a coating solution. This solution was applied onto the hard coat layer with a bar coater so as to give a dry film thickness of 90 nm, and dried at 120° C. for 3 minutes to form an antireflection layer.

(4) Formation of Visible Light Absorption Layer and Infrared Absorption Layer

A 1 N solution of sodium hydroxide was added to 180 g of a 10 wt % aqueous solution of gelatin to provide pH 7, and 15 mg/m² of the above-mentioned dye 1, 24.5 mg/m² of compound 2-7, 45.9 mg/m² of compound 1-12, 29.1 mg/m² of compound 1-13 and 120 mg/m² of the above-mentioned dye 2 were added thereto, followed by stirring at 30° C. for 24 hours to prepare a coating solution for a filter layer. The resulting coating solution was applied onto the 300-nm thick undercoat layer side on the back face of the transparent support so as to give a dry film thickness of 3.5 μm, and dried at 120° C. for 10 minutes to prepare laminate (A).

Examination of the spectral transmittance for laminate (A) thus prepared revealed that laminate (A) had absorption maximums at 400 nm, 593 nm, 810 nm, 904 nm and 985 nm. The transmittance at the absorption maximum at 400 nm was 35%, the transmittance at the absorption maximum at 593 nm was 30%, the transmittance at the absorption maximum at 810 nm was 5%, the transmittance at the absorption maximum at 905 nm was 1%, and the transmittance at the absorption maximum at 983 nm was 3%.

[Transparent Support (B) with Conductive Layer]

An ultraviolet curing multifunctional methacrylic acid resin (Z7503, manufactured by JSR Corporation) was applied onto a 250-μm thick transparent support (transparent, biaxially oriented polyethylene terephthalate film) to a thickness of 3 μm as an overcoat layer. Then, a $TiO_2$ film was formed thereon as a metal oxide layer by the dual magnetron sputtering method using a traveling sputtering apparatus. At this time, the oxygen amount was controlled by the plasma emission monitor method. The degree of vacuum was 0.34 Pa.

As a metal film, an Ag film was formed using a traveling sputtering apparatus. The degree of vacuum was 0.3 Pa. As a protective metal layer, a Ti film was formed using traveling sputtering apparatus. The degree of vacuum was 0.27 Pa.

An overcoat layer, a $TiO_2$ layer, an Ag layer, a Ti layer, a $TiO_2$ layer, an Ag layer, a Ti layer and a $TiO_2$ layer were laminated on the support in this order to 3 nm, 21 nm, 16 nm, 1.3 nm, 44 nm, 16 nm, 1.3 nm and 21 nm, respectively, in thickness by the above-mentioned method.

The surface resistivity of the resulting laminated film was 2.7 Ω/square, which was a sufficient value of resistance as the electromagnetic shielding performance. Further, the transmittance at 550 nm was 70%. Furthermore, silver contained 1 mol % of palladium.

This transparent support with the conductive layer is hereinafter taken as transparent support (B).

[Preparation of Laminated Optical Filters]

Laminate (A), transparent support (B) and another transparent support were laminated using an acrylic adhesive to prepare optical filters F21 to F25 according to the invention. The constitution of the filters thus prepared is shown in Table 4.

Further, laminate (A) was laminated so that the antireflection layer was situated on the viewer side.

TABLE 4

| | Optical Filter (Invention) | | | | |
|---|---|---|---|---|---|
| | F21 | F22 | F23 | F24 | F25 |
| Layer Closest to Viewer | Laminate (A) | Laminate (A) | Laminate (A) | Laminate (A) | Laminate (A) |
| Layer under the Above | 250-μm thick PET | 500-μm thick PET | Support (B) | 175-μm thick PET | 300-μm thick PC |
| Layer under the Above | Not used | Not used | Not used | 250-μm thick PET | Not used |

PET: Polyethylene terephthalate
PC: Polycarbonate

Optical filters F26 to F28 shown in Table 5 were prepared for comparison.

TABLE 5

| | Optical Filter (Comparison) | | |
|---|---|---|---|
| | F26 | F27 | F28 |
| Layer Closest to Viewer | Laminate (A) | Support (B) | 175-μm thick PET |
| Layer under the Above | Not used | Not used | 175-μm thick PET |
| Layer under the Above | Not used | Not used | Not used |

Each of the above-mentioned optical filters was adhered to a glass plate having a thickness of 3 mm, and struck with hummer to damage it. Then, the state of each filter was evaluated. Further, each filter was directly adhered to a plasma display, and the hues and the near infrared transmittance in the region of 800 to 900 nm were evaluated.

TABLE 6

| | Optical Filter | | | | | | | |
|---|---|---|---|---|---|---|---|---|
| | Invention | | | | | Comparison | | |
| | F21 | F22 | F23 | F24 | F25 | F26 | F27 | F28 |
| Evaluation in Glass Damage | Fair | Good | Good | Good | Good | Poor | Poor | Good |
| Evaluation of Hues | Good | Good | Good | Good | Good | Good | Poor | Poor |
| Evaluation of Infrared Transmittance | Good | Good | Good | Good | Good | Good | Poor | Poor |
| Reflectance | Good | Good | Good | Good | Good | Poor | Good | Poor |

In optical filter F26 for comparison, laminate (A) has the visible light absorption layer and the light absorption layer, but no antireflection layer. In optical filter F27, transparent support (B) has no visible light absorption layer and no light absorption layer. The metal film acts as the antireflection layer.

Evaluation in Glass Damage
  Good: No breakage is developed in a filter.
  Fair: A filter breaks, and glass projects therefrom at 3 or less portions.
  Poor: A filter breaks, and glass projects therefrom at 4 or more portions.
Evaluation of Hues (Visual Observation)
  Good: Both white light and red light are effectively improved.
  Poor: Greenish white and orange tinged red are observed.
Evaluation of Infrared Transmittance
  Good: All the transmittances at 800 nm to 820 nm, 890 nm to 910 nm and 970 nm to 990 nm are 20% or less.
  Fair: Some are 20% or more.
  Poor: All are 10% or more.
Evaluation of Reflectance
  Good: The average reflectance at 450 nm to 650 nm is less than 1.5%.
  Poor: The average reflectance at 450 nm to 650 nm is 1.5% or more.

From these results, it is clear that the optical filters of the invention are excellent in production yields, and satisfy safety to incised wounds in glass damage, improvements in color and infrared shielding properties at the same time, when applied to image displays.

EXAMPLE 3

[Formation of Undercoat Layer and Antistatic Layer]

Both faces of a 175-μm thick transparent support (biaxially oriented polyethylene terephthalate film) were subjected to a corona treatment. Then, a latex comprising a styrene-butadiene copolymer having a refractive index of 1.55 and a glass transition temperature of 37° C. (LX407C5, manufactured by Nippon Zeon Co., Ltd) was applied onto the back face thereof on which a visible light absorption layer and an infrared shield layer are provided, so as to give a film thickness of 300 nm, thereby forming an undercoat layer. A mixture of a latex comprising a styrene-butadiene copolymer having a refractive index of 1.55 and a glass transition temperature of 37° C. (LX407C5, manufactured by Nippon Zeon Co., Ltd) and a mixed oxide of tin oxide/ antimony oxide (FS-10D, manufactured by Ishihara Sangyo Kaisha, Ltd.) at a ratio of 5:5 by weight was applied onto the front face, the opposite face, so as to give a film thickness of 200 nm after drying, thereby forming an undercoat layer also serving as an antistatic layer.

[Formation of Hard Coat Layer]

A 48 wt % dispersion of zirconium oxide in a mixture of methyl ethyl ketone/cyclohexanone of a weight ratio of 1/1 by weight (37.2 g), 4.46 g of dipentaerythritol hexaacrylate (DPHA, manufactured by Nippon Kayaku Co., Ltd.) and 1.17 g of a photopolymerization initiator (Irgacure 907, manufactured by Ciba Geigy Corporation) were mixed to prepare a solution.

The above-mentioned solution was applied onto the undercoat layer also serving as the antistatic layer formed on the front face in (1) described above, with a wire bar so as to give a dry film thickness of 6 µm, dried, and irradiated with ultraviolet rays to harden it, thereby forming a hard coat layer.

[Formation of Antireflection Layer]

t-Butanol (1.5 g) was added to 2.50 g of are active fluorine polymer (JN-7219, manufactured by JSR Corporation), followed by stirring at room temperature for 10 minutes. The resulting solution was filtered through a 1-µm polypropylene filter to prepare a coating solution. This solution was applied onto the hard coat layer with a bar coater so as to give a dry film thickness of 90 nm, and dried at 120° C. for 3 minutes.

[Formation of Visible Light Absorption Layer and Infrared Absorption Layer]

A 1 N solution of sodium hydroxide was added to 180 g of a 10 wt % aqueous solution of gelatin to provide pH 7, and 15 mg/m$^2$ of the above-mentioned dye 1, 24.5 mg/m$^2$ of compound 2-7, 45.9 mg/m$^2$ of compound 1-12, 29.1 mg/m$^2$ of compound 1-13 and 120 mg/m$^2$ of the above-mentioned dye 2 were added thereto, followed by stirring at 30° C. for 24 hours to prepare a coating solution for a filter layer. The resulting coating solution was applied onto the 300-nm thick undercoat layer side of the transparent support so as to give a dry film thickness of 3.5 µm, and dried at 120° C. for 10 minutes to prepare an optical filter.

[Formation of Conductive Layer]

An ultraviolet curing multifunctional methacrylic acid resin (Z7503, manufactured by JSR Corporation) was applied onto a 175-µm thick transparent support (transparent, biaxially oriented polyethylene terephthalate film) to a thickness of 3 µm as an overcoat layer. Then, a TiO$_2$ film was formed thereon as a metal oxide layer by the dual magnetron sputtering method using a traveling sputtering apparatus. At this time, the oxygen amount was controlled by the plasma emission monitor method. The degree of vacuum was 0.34 Pa.

As a metal film, an Ag film was formed using a traveling sputtering apparatus. The degree of vacuum was 0.3 Pa.

As a protective metal layer, a Ti film was formed using traveling sputtering apparatus. The degree of vacuum was 0.27 Pa.

An overcoat layer, a TiO$_2$ layer, an Ag layer, a Ti layer, a TiO$_2$layer, an Ag layer, a Ti layer and a TiO$_2$layer were laminated on the support in this order to 3 nm, 21 nm, 16 nm, 1.3 nm, 44 nm, 16 nm, 1.3 nm and 21 nm, respectively, in thickness by the above-mentioned method.

The surface resistivity of the resulting film was 2.7 Ω/square, which was a sufficient value of resistance as the electromagnetic shielding performance. Further, the transmittance at 550 nm was 70%. Furthermore, silver contained 1 mol % of palladium.

[Preparation of Laminated Optical Filters F31 to F37]

The antireflection layer, the support on which the visible light absorption layer and the infrared absorption layer were formed, a second support and a third support were laminated using an acrylic adhesive so that the antireflection layer was situated on the viewer side, thereby preparing an optical filter. The film thickness of each layer and the total thickness of the adhesive are shown in Table 7.

The constitution of the filters thus prepared is shown in Table 7.

TABLE 7

|  | F31 | F32 | F33 | F34 | F35 | F36 | F37 |
|---|---|---|---|---|---|---|---|
| Uppermost Layer | 175 µm PET | 175 µm PET | 175 µm PET | 175 µm PET | 100 µm PET | 175 µm PET | 175 µm PET |
| Layer under the Above | 175 µm PET | 175 µm PET | 250 µm PET | 250 µm PET | 250 µm PET | 350 µm PC | 350 µm PET |
| Layer under the Above | Not used | 100 µm PET | 175 µm PET | 250 µm PET | 100 µm PET | 175 µm PET | 175 µm PET |
| Total Thickness of Support | 350 µm | 450 µm | 600 µm | 675 µm | 450 µm | 700 µm | 700 µm |
| Total Thickness of Adhesive | 35 µm | 60 µm | 80 µm | 88 µm | 75 µm | 78 µm | 90 µm |
| Elastic Modulus Gpa | 3.44 | 3.30 | 3.26 | 3.17 | 3.46 | 3.24 | 3.26 |

PET: Polyethylene terephthalate
PC: Polycarbonate

For the optical filter thus prepared, the spectral transmittance was examined. As a result, the transmittance at the absorption maximum at 400 nm was 35%, the transmittance at the absorption maximum at 593 nm was 30%, the transmittance at the absorption maximum at 810 nm was 5%, the transmittance at the absorption maximum at 905 nm was 1%, and the transmittance at the absorption maximum at 983 nm was 3%.

Measurement of Elastic Modulus

The elastic modulus was measured under 5-µm indentation conditions using a Fisher Scope H100V tester (manufactured by Fisher) (the same applies to Table 8).

In filters F33 to F37, the visible light absorption layer and the infrared absorption layer are formed in the same manner as with filter F31, and in filter 32, they are formed on an upper face of the second layer.

In filter F37, the above-mentioned transparent conductive layer is provided as PET of the lowermost layer.

[Preparation of Filter F41 to F46 for Comparison]

The antireflection layer was provided on the polyethylene terephthalate film, and the acrylic adhesive (25 µm) was provided on the opposite side, in the same manner as with filters F31 to F37 of the invention.

The constitution of the filters for comparison thus prepared is shown in Table 8.

TABLE 8

|  | F41 | F42 | F43 | F44 | F45 | F46 |
|---|---|---|---|---|---|---|
| Uppermost Layer | 175 µm PET | 250 µm PET | 500 µm PET | 100 µm PET | 75 µm PET | 250 µm PET |
| Layer under the Above | Not used | Not used | Not used | 100 µm PET | 75 µm PET | 250 µm PET |
| Layer under the Above | Not used | Not used | Not used | Not used | 75 µm PET | 250 µm PET |
| Layer under the Above | Not used | Not used | Not used | Not used | 75 µm PET | 300 µm PET |
| Total Thickness of Support | 175 µm | 250 µm | 500 µm | 200 µm | 300 µm | 1050 µm |
| Total Thickness of Adhesive | 25 µm | 25 µm | 25 µm | 50 µm | 180 µm | 80 µm |
| Elastic Modulus GPa | 3.54 | 3.52 | 3.54 | 3.55 | 3.1 | 3.3 |

Filters F45 and F46 were each prepared for comparison in which the adhesive layer and the transparent support were thick. When the adhesive layer and the transparent support are thickened as such, a reduction in the filter function such as deterioration of the haze is anticipated. The four-layer structure was therefore employed so that the layers other than the adhesive layer and the transparent support were not changed in thickness.

Each of these filters was adhered to a glass plate having a thickness of 3 mm, and struck with hummer to damage it. Then, the state of each filter was evaluated. Further, each filter was directly adhered to a plasma display, and the hues and the near infrared transmittance in the region of 800 to 900 nm were evaluated by the following methods. Results thereof are shown in Tables 9 and 10.

Evaluation in Glass Damage

Very good: No breakage is developed in a filter.

Good: A filter breaks, and glass projects therefrom at one portion.

Fair: A filter breaks, and glass projects therefrom at 2 to 5 portions.

Poor: A filter breaks and glass projects therefrom at 6 or more portions.

Evaluation of Hues (Visual Observation)

Poor: Greenish white and orange tinged red are observed.

Good: Both white light and red light are effectively improved.

Evaluation of Infrared Transmittance

Good: All the transmittances at 800 nm to 820 nm, 890 nm to 910 nm and 970 nm to 990 nm are less than 20%.

Fair: Some are 20% or more.

Poor: All are 20% or more.

Evaluation of Reflectance

The back of a filter was painted black, and the reflectance was measured with a V-550 tester manufactured by JASCO Corporation.

Good: The average reflectance at 450 nm to 650 nm is less than 1.5%.

Poor: The average reflectance at 450 nm to 650 nm is 1.5% or more.

Evaluation of Clarity

The clarity was measured with an NDH1001DP haze meter manufactured by Nippon Denshoku Kogyo Co., Ltd.

Good: The haze is less than 2%.

Poor: The haze is 2% or more.

TABLE 9

|  | F31 | F32 | F33 | F34 | F35 | F36 | F37 |
|---|---|---|---|---|---|---|---|
| Evaluation in Glass Damage | Good | Good | Very good | Very good | Very good | Very good | Very good |
| Evaluation of Hues | Good | Good | Good | Good | Good | Good | Good |
| Infrared Transmittance | Good | Good | Good | Good | Good | Good | Good |
| Reflectance | Good | Good | Good | Good | Good | Good | Good |
| Clarity | Good | Good | Good | Good | Good | Good | Good |

TABLE 10

|  | F41 | F42 | F43 | F44 | F45 | F46 |
|---|---|---|---|---|---|---|
| Evaluation in Glass Damage | Poor | Poor | Poor | Poor | Good | Good |
| Evaluation of Hues | Poor | Poor | Poor | Poor | Good | Good |
| Infrared Transmittance | Poor | Poor | Poor | Poor | Good | Good |
| Reflectance | Good | Good | Good | Good | Good | Good |
| Clarity | Good | Good | Good | Good | Poor | Poor |

The filters of the invention are clearly excellent in satisfying safety to incised wounds in glass damage, improvements in color, infrared shielding properties, antireflection properties and clarity at the same time.

Filters F45 and F46 for comparison were each as high as 5% and 6%, respectively, in haze, so that they could not be practically used.

When applied to the image displays, the optical filters of the invention (i) can prevent a reflection of external light, reduce the intensity of infrared rays emitted from the image display, improve the color purity, and cause no moiré phenomenon, when it is applied to the image display; and (ii) make front glass plates removable while maintaining the damage prevention of screens of the image displays and safety in damage, and realize a decrease in weight of main bodies of the image displays and cost reduction.

The image displays of the invention provided with the above-mentioned optical filters are excellent in the characteristics of (i) described above, from which front glass plates are removable while maintaining the damage prevention of screens of the image displays and safety in damage, and realize a decrease in weight and cost reduction.

The entire disclosure of each and every foreign patent application from which the benefit of foreign priority has been claimed in the present application is incorporated herein by reference, as if fully set forth herein.

What is claimed is:

1. An optical filter comprising:
    a laminate (A) comprising: a first transparent support; and at least one of an antireflection layer, an antiglare layer, a soil-resistant layer, a hard coat layer and an antistatic layer;
    a transparent support (B);
    at least one of a visible light absorption layer and an infrared shield layer, the infrared shield layer absorbing near infrared rays having a wavelength of 750 nm to 1200 nm; and
    at least one transparent support other than the transparent support (B) provided between the laminate (A) and a front face of an image display;
    wherein the at least one of a visible light absorption layer and an infrared shield layer is provided on the first transparent support at the opposite side to which the at least one of an antireflection layer, an antiglare layer, a soil-resistant layer, a hard coat layer and an antistatic layer are provided, or on the transparent support (B).

2. The optical filter according to claim 1, wherein the laminate (A) is disposed on a viewer side and the transparent support (B) is disposed on a front side of an image display, and the laminate (A) comprises the antireflection layer as an outermost layer.

3. The optical filter according to claim 2, wherein one transparent support selected from the group consisting of the first transparent support, the transparent support (B), and the at least one transparent support other than the transparent support (B) has a thickness of 225 $\mu$m or more, the total thickness of the first transparent support, the transparent support (B), and the at least one transparent support other than the transparent support (B) is within the range of 300 $\mu$m to 1000 $\mu$m, and
    the optical filter further comprises at least one adhesive layer, wherein the total thickness of the at least one adhesive layer is within the range of 30 $\mu$m to 150 $\mu$m.

4. The optical filter according to claim 1, which has an elastic modulus of 3.5 GPa or less.

5. The optical filter according to claim 1, wherein a conductive layer having a surface resistivity of 500 $\Omega$/square or less is provided on a transparent support other than the first transparent support.

6. The optical filter according to claim 5, wherein the conductive layer comprises one of a metal film and a laminate of a metal film and a metal oxide film.

7. The optical filter according to claims 1, wherein the infrared shield layer comprises a dye having an absorption in the infrared region.

8. The optical filter according to claim 1, wherein the infrared shield layer comprises a dye having a transmittance of 20% or less in each of the ranges of 750 nm to 850 nm, 851 nm to 950 nm and 951 nm to 1100 nm.

9. The optical filter according to claim 1, wherein the visible light absorption layer comprises a dye.

10. The optical filter according to claim 9, wherein the dye is a cyanine dye.

11. The optical filter according to claim 1, wherein the visible light absorption layer has an absorption maximum in the wavelength region of 560 nm to 620 nm.

12. The optical filter according to claim 1, wherein the half-value width of a light absorption band of the visible light absorption layer is 50 nm or less.

13. An image display in which the optical filter according to claim 1 is affixed to a front face of the image display.

14. The image display according to claim 13, wherein the image display is a plasma display panel.

* * * * *